United States Patent
Yokoo et al.

(10) Patent No.: US 11,675,262 B2
(45) Date of Patent: Jun. 13, 2023

(54) PROJECTION SYSTEM, CONTROL DEVICE, AND IMAGE PROJECTION METHOD

(71) Applicant: SEIKO EPSON CORPORATION, Tokyo (JP)

(72) Inventors: Tomohiro Yokoo, Matsumoto (JP); Yoshisada Aoki, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 64 days.

(21) Appl. No.: 17/485,697

(22) Filed: Sep. 27, 2021

(65) Prior Publication Data
US 2022/0100072 A1 Mar. 31, 2022

(30) Foreign Application Priority Data
Sep. 28, 2020 (JP) .............................. JP2020-161700

(51) Int. Cl.
*G03B 21/60* (2014.01)
*G03B 21/608* (2014.01)
*G03B 21/20* (2006.01)
*G03B 21/14* (2006.01)

(52) U.S. Cl.
CPC ......... *G03B 21/608* (2013.01); *G03B 21/142* (2013.01); *G03B 21/2033* (2013.01)

(58) Field of Classification Search
CPC .. G03B 21/14; G03B 21/608; G03B 21/2033; G03B 21/142; G03B 21/56; G03B 21/60; G03B 21/28; G03B 21/62; G03B 21/145; G03B 21/315; H04N 9/315; H04N 9/3108; H04N 9/3141; H04N 9/3152; H04N 9/3155; H04N 13/39; H04N 13/383; H04N 13/393; H04N 13/395; H04N 13/398
USPC ............................................ 353/79; 359/443
See application file for complete search history.

(56) References Cited

U.S. PATENT DOCUMENTS

| | | | | |
|---|---|---|---|---|
| 5,368,228 A | * | 11/1994 | Adamson | B05B 1/267 239/524 |
| 8,328,367 B2 | * | 12/2012 | Nemeth | G03B 21/60 40/406 |
| 8,567,954 B2 | * | 10/2013 | Koehler | H04N 13/363 239/18 |
| 9,223,192 B1 | * | 12/2015 | Linnell | G03B 21/608 |
| 10,197,904 B2 | * | 2/2019 | Evreinov | G02B 30/56 |

(Continued)

FOREIGN PATENT DOCUMENTS

| JP | 2015-121655 A | 7/2015 |
|---|---|---|
| JP | 2018-506879 A | 3/2018 |

*Primary Examiner* — Sultan Chowdhury
(74) *Attorney, Agent, or Firm* — Oliff PLC

(57) ABSTRACT

A projection system includes a screen forming device configured to form a screen by ejecting liquid from a plurality of nozzles and a projector, acquires three-dimensional shape data formed by a three-dimensional coordinate system having an X axis, a Y axis, and a Z axis, divides the three-dimensional shape data in an X-axis direction to generate sectional shape data, acquires coordinates of the sectional shape data, executes matching processing for correlating the coordinates of the sectional shape data, pixels with which the projector draws an image, the nozzles of the screen forming device, and heights in an ejection space of the liquid ejected from the nozzles, and projects an image onto the screen according to the correlation by the matching processing.

17 Claims, 31 Drawing Sheets

(56) References Cited

U.S. PATENT DOCUMENTS

2011/0285964 A1* 11/2011 Reichow .................. F25C 3/00
239/14.2
2017/0371172 A1   12/2017 Keane et al.

* cited by examiner

PROJECTION SYSTEM, CONTROL DEVICE, AND IMAGE PROJECTION METHOD

The present application is based on, and claims priority from JP Application Serial Number 2020-161700, filed Sep. 28, 2020, the disclosure of which is hereby incorporated by reference herein in its entirety.

BACKGROUND

1. Technical Field

The present disclosure relates to a projection system, a control device, and an image projection method.

2. Related Art

There has been known a technique for forming a screen with liquid and projecting an image onto the screen (see, for example, JP-A-2015-121655 (Patent Literature 1)). A projection system described in Patent Literature 1 blows mist generated by an ultrasonic transducer upward with a fan and forms a screen. The projection system projects, with a projector, an image onto the screen formed by the mist. The projection system drives the fan for blowing out the mist to thereby form a screen having size corresponding to the projected image.

An image projected by a configuration described in Patent Literature 1 is a plane image obtained by developing image data on a video RAM. Therefore, it is difficult to display an image having cubic effect.

SUMMARY

An aspect of the present disclosure is directed to a projection system that projects image light onto a screen, the projection system including: a screen forming device including a plurality of nozzles and configured to form the screen by ejecting liquid onto an optical path of the image light from the nozzles; a projection device including a light source and a light modulating device configured to modulate light emitted by the light source to form the image light, the projection device projecting the image light onto the screen; and a control device including a data generating section configured to divide three-dimensional shape data to generate sectional shape data, the control device controlling the projection device and the screen forming device based on the sectional shape data. The nozzles of the screen forming device are disposed side by side on an X-Y surface extending along a direction of an X axis, which is a direction in which the screen corresponding to the sectional shape data overlaps, and a direction of a Y axis crossing the X axis. The light modulating device included in the projection device has a configuration for forming an image using a plurality of pixels and modulating, with the pixels, the light emitted by the light source. The control device includes a matching processing section configured to correlate coordinates of the sectional shape data, coordinates in the pixels of the projection device, the nozzles of the screen forming device, and heights of an ejection space from the nozzles in a Z-axis direction orthogonal to the X-Y surface.

Another aspect of the present disclosure is directed to a projection system that projects image light onto a screen, the projection system including: a screen forming device including a plurality of nozzles and configured to form the screen by ejecting liquid onto an optical path of the image light from the nozzles; and a projection device configured to draw an image using a plurality of pixels and project image light modulated by the pixels onto the screen. When a direction along the image light is represented as an X axis, an axis orthogonal to the X axis is represented as a Y axis, and an axis orthogonal to the X axis and the Y axis is represented as a Z axis, the screen forming device includes the nozzles disposed side by side in the X-axis direction and the Y-axis direction. The projection device includes a storing section configured to store three-dimensional display formation data obtained by executing matching processing for correlating coordinates of sectional shape data obtained by dividing three-dimensional shape data in the X-axis direction with the pixels and heights of an ejection space in the Z-axis direction from the nozzles. The projection system drives the pixels and the nozzles of the screen forming device based on the three-dimensional display formation data stored in the storing section of the projection device.

Still another aspect of the present disclosure is directed to a projection system including: a projection device including a light source and a light modulating device configured to modulate light emitted by the light source to form image light, the projection device projecting the image light; a screen forming device including a plurality of nozzles disposed side by side in a first direction along an optical path of the image light and a second direction crossing the first direction, the screen forming device forming a screen by ejecting liquid onto an optical path of the image light from the nozzles; and a control device configured to control the projection device and the screen forming device based on sectional shape data obtained by dividing three-dimensional shape data. The control device causes the projection device to project the image light of an image based on the sectional shape data, controls, based on the sectional shape data, timing for ejecting the liquid from a plurality of the nozzles lined in the second direction, and performs control for matching timing for ejecting the liquid from a plurality of the nozzles lined in the first direction with timing when the projection device switches the sectional shape data.

Still another aspect of the present disclosure is directed to a control device used in combination with a projection device that projects image light and a screen forming device that forms a screen by ejecting liquid onto an optical path of the image light from a plurality of nozzles, the control device including: a data generating section configured to acquire three-dimensional shape data formed by a three-dimensional coordinate system having an X axis, a Y axis, and a Z axis orthogonal to one another and divide the three-dimensional shape data to generate sectional shape data; and a matching processing section configured to correlate coordinates of the sectional shape data, pixels with which the projection device draws an image, the nozzles of the screen forming device, and heights in an ejection space of the liquid ejected from the nozzles.

Still another aspect of the present disclosure is directed to an image projection method for projecting an image using a screen forming device that forms a screen by ejecting liquid from a plurality of nozzles and a projection device that draws an image using a plurality of pixels and projects image light modulated by the pixels onto the screen, the image projection method including: acquiring three-dimensional shape data formed by a three-dimensional coordinate system having an X axis, a Y axis, and a Z axis orthogonal to one another; dividing the three-dimensional shape data in the X-axis direction to generate sectional shape data; acquiring coordinates of the sectional shape data; executing matching processing for correlating coordinates of the sectional shape data, pixels with which the projection device draws an image, the nozzles of the screen forming device, and heights in an ejection space of the liquid ejected from the nozzles; and driving the pixels and the nozzles of the screen forming device based on the sectional shape data and according to the correlation by the matching processing and projecting an image onto the screen.

DESCRIPTION OF EXEMPLARY EMBODIMENTS

1. First Embodiment 1-1. Overall Configuration of a Projection System 1

Figure 1:
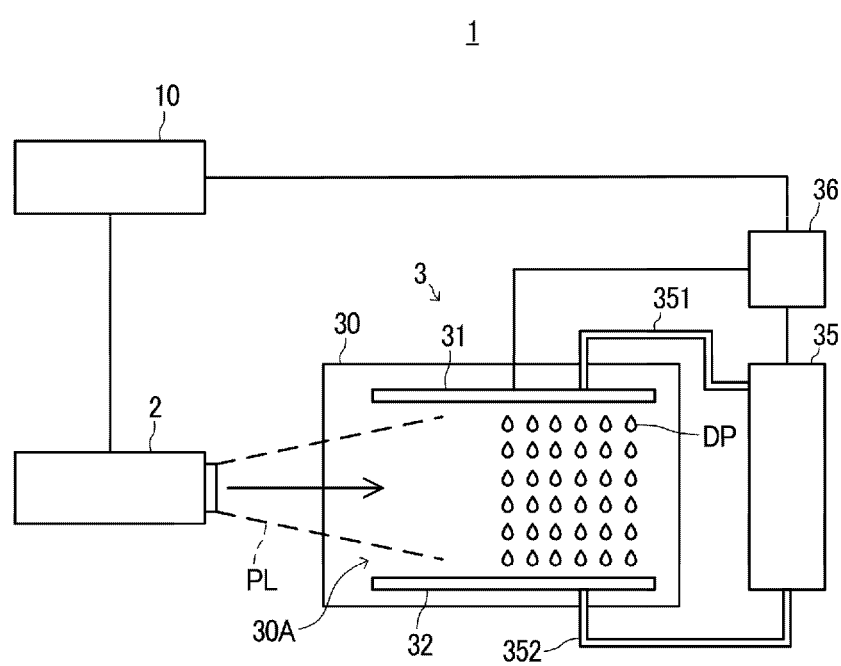
FIG. 1 is a diagram showing a schematic configuration of a projection system.

FIG. 1 is a diagram showing a schematic configuration of a projection system 1.

The projection system 1 includes a projector 2, a screen forming device 3, and a control device 10. The projector 2 projects image light PL according to control by the control device 10. The screen forming device 3 includes a screen forming section 30. The screen forming section 30 includes an ejection head 31 that ejects liquid and a collection unit 32 that collects the liquid ejected by the ejection head 31. The screen forming section 30 causes the liquid to flow down to an ejection space 30A between the ejection head 31 and the collection unit 32 as drop-like droplets DP.

The control device 10 controls the projector 2 to project the image light PL and controls the screen forming device 3 to form a screen. The projector 2 corresponds to an example of the projection device.

The projection head 31 includes a plurality of nozzles 33 explained below and ejects the droplets DP from the nozzles 33. Although the detail will be described later, the nozzles 33 are arranged in a line on the ejection head 31. Accordingly, the droplets DP linearly fall in the ejection space 30A along an array direction of the nozzles 33 and arrive at the collection unit 32.

The liquid used by the screen forming device 3 includes liquid containing water and an organic solvent as main components. A most typical example of the liquid is water or a mixture of water and other liquid. The liquid may be a solution in which an inorganic substance and/or an organic substance is dissolved. The liquid used by the screen forming device 3 only has to be liquid having an optical characteristic for reflecting and/or diffusing a visible ray.

Figure 2:
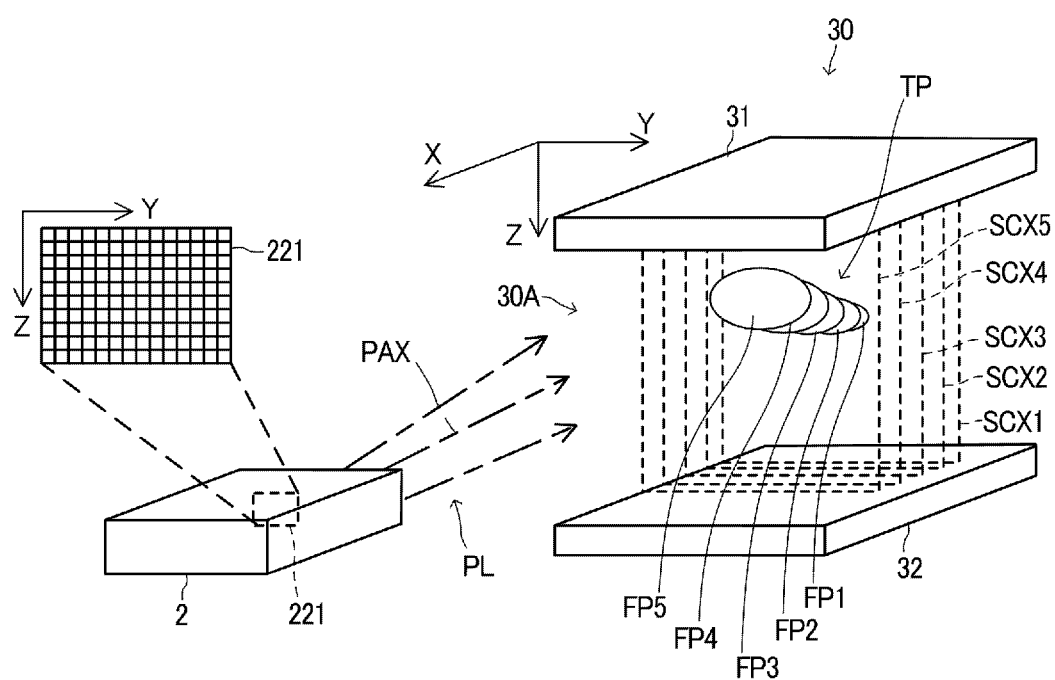
FIG. 2 is an explanatory diagram showing a projection state by the projection system.

FIG. 2 is an explanatory diagram showing a projection state by the projection system 1.

As shown in FIG. 2, the projector 2 is disposed to be opposed to the screen forming section 30 and projects the image light PL toward the screen forming section 30. An optical axis of the image light PL projected by the projector 2 is indicated by a sign PAX. The optical axis PAX is an imaginary axis in the center of the image light PL and is, for example, an axis passing an optical center of a not-shown projection lens included in the projector 2. The projection system 1 specifies a position in the screen forming section 30 as an X-Y-Z orthogonal coordinate formed by an X axis parallel to the optical axis PAX, a Y axis orthogonal to the X axis, and a Z axis orthogonal to the X axis and the Y axis. An X-Y plane is a plane perpendicular to the X axis. The Z axis is, for example, the vertical direction. The X axis is not limited to be parallel to the optical axis PAX and may be inclined with respect to the optical axis PAX. The X axis is also a direction along image light explained below and may be a direction in which a screen corresponding to sectional shape data explained below overlaps.

The screen forming section 30 forms a plurality of screens SCX1, SCX2, SCX3, . . . lined in the X-axis direction. The screens SCX1, SCX2, SCX3, . . . are respectively formed while the droplets DP fall in the ejection space 30A after being ejected from the ejection head 31. The projector 2 projects the image light PL according to the control by the control device 10 according to timing when the screens SCX1, SCX2, SCX3, . . . are formed in the ejection space 30A. For example, the projector 2 projects a plane image FP1 at timing when the screen SCX1 is formed and projects a plane image FP2 at timing when the screen SCX 2 is formed. Consequently, a plurality of plane images FP1, FP2, FP3, . . . are formed in the ejection space 30A. The plurality of plane images FP1, FP2, FP3, . . . are projected to be superimposed in the X-axis direction. Therefore, an optical system with large depth of field is used as a projection optical system of the projector 2. Alternatively, it is preferable to automatically adjust a focus according to formation positions of the plurality of plane images FP1, FP2, FP3, . . . . The ejection space 30A may be configured to be surrounded by a case or may be configured by a frame.

In this embodiment, the projection system 1 projects a sectional image obtained by slicing one stereoscopic image TP as the plane images FP1, FP2, FP3, . . . . The projection system 1 can display the stereoscopic image TP as an image having cubic effect by projecting the plane images FP1, FP2, FP3, . . . onto the plurality of screens SCX1, SCX2, SCX3, . . . lined in the X-axis direction.

In this embodiment, an example is explained in which the plane image FP displayed by the projector 2 is a still image. However, the plane image FP may be a moving image, that is, a video.

Referring back to FIG. 1, the screen forming device 3 includes a liquid supply system 35 that supplies liquid to the ejection head 31 and takes in the liquid collected by the collection unit 32. The screen forming device 3 includes a head control section 36 that controls the ejection head 31 and the liquid supply system 35.

The droplets DP ejected by the ejection head 31 arrive at the collection unit 32 and accumulate as liquid. The liquid accumulating in the collection unit 32 is collected by the liquid supply system 35 through a collection pipe 352. The liquid supply system 35 supplies the liquid collected from the collection unit 32 to the ejection head 31 through the liquid supply pipe 351.

Figure 3:
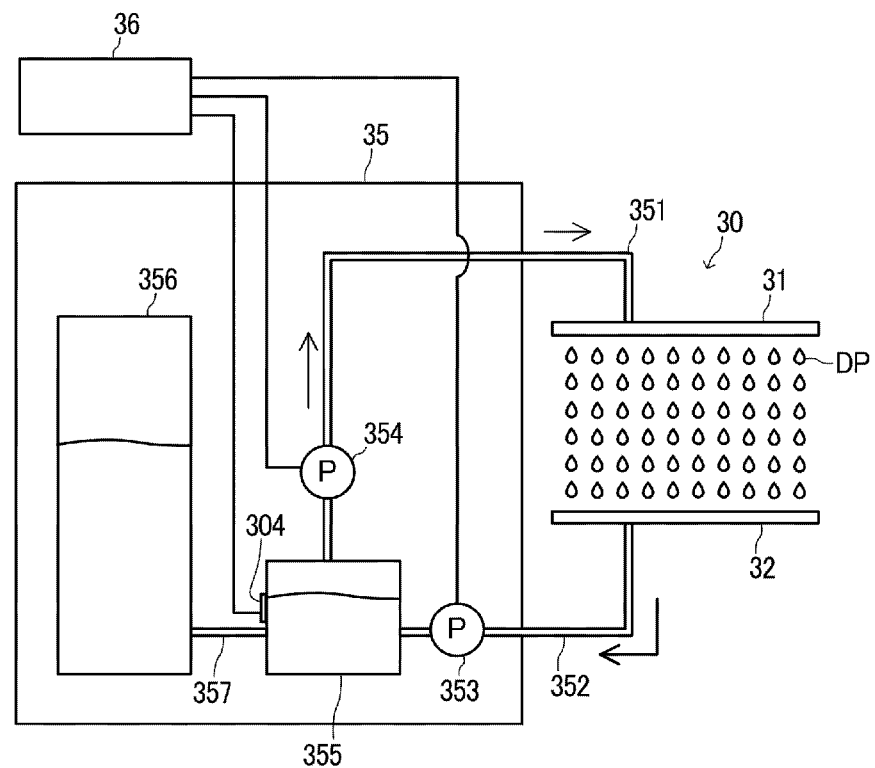
FIG. 3 is a schematic diagram of a liquid collection system.

FIG. 3 is a schematic diagram of the liquid supply system 35.

The liquid supply system 35 includes pumps 353 and 354, a sub-tank 355, and a main tank 356. The pumps 353 and 354 are driven by the head control section 36 and transport liquid. The sub-tank 355 and the main tank 356 are tanks that store the liquid. The main tank 356 is coupled to the sub-tank 355 via a pipe 357.

A liquid-amount detecting section 304 that detects a liquid amount is disposed in the sub-tank 355. The liquid-amount detecting section 304 is configured by, for example, a sensor that detects the height of a liquid surface. Specifically, as the liquid-amount detecting section 304, an optical sensor that detects presence or absence of the liquid in a predetermined height position, a float-type sensor that detects whether a float is floating on the liquid surface, and the like can be used.

The sub-tank 355 is coupled to the collection unit 32 by the collection pipe 352. The pump 353 is provided in the collection pipe 352. The droplets DP dropping to the collection unit 32 are transported on the inside of the collection pipe 352 by the pump 353 and stored in the sub-tank 355. The sub-tank 355 is coupled to the ejection head 31 by the liquid supply pipe 351. The pump 354 is provided in the liquid supply pipe 351. The liquid stored in the sub-tank 355 is supplied to the ejection head 31 through the liquid supply pipe 351 by the pump 354.

When the liquid-amount detecting section 304 detects that an amount of the liquid stored in the sub-tank 355 is less than a predetermined amount, the liquid is supplied from the main tank 356 to the sub-tank 355. In this case, the head control section 36 may drive a not-shown pump and a not-shown valve provided in the pipe 357 to control the supply of the liquid from the main tank 356 to the sub-tank 355. The liquid may automatically flow from the main tank 356 to the sub-tank 355 according to a liquid amount in the sub-tank 355 and a liquid amount in the main tank 356 without involving the control by the head control section 36.

Figure 4:
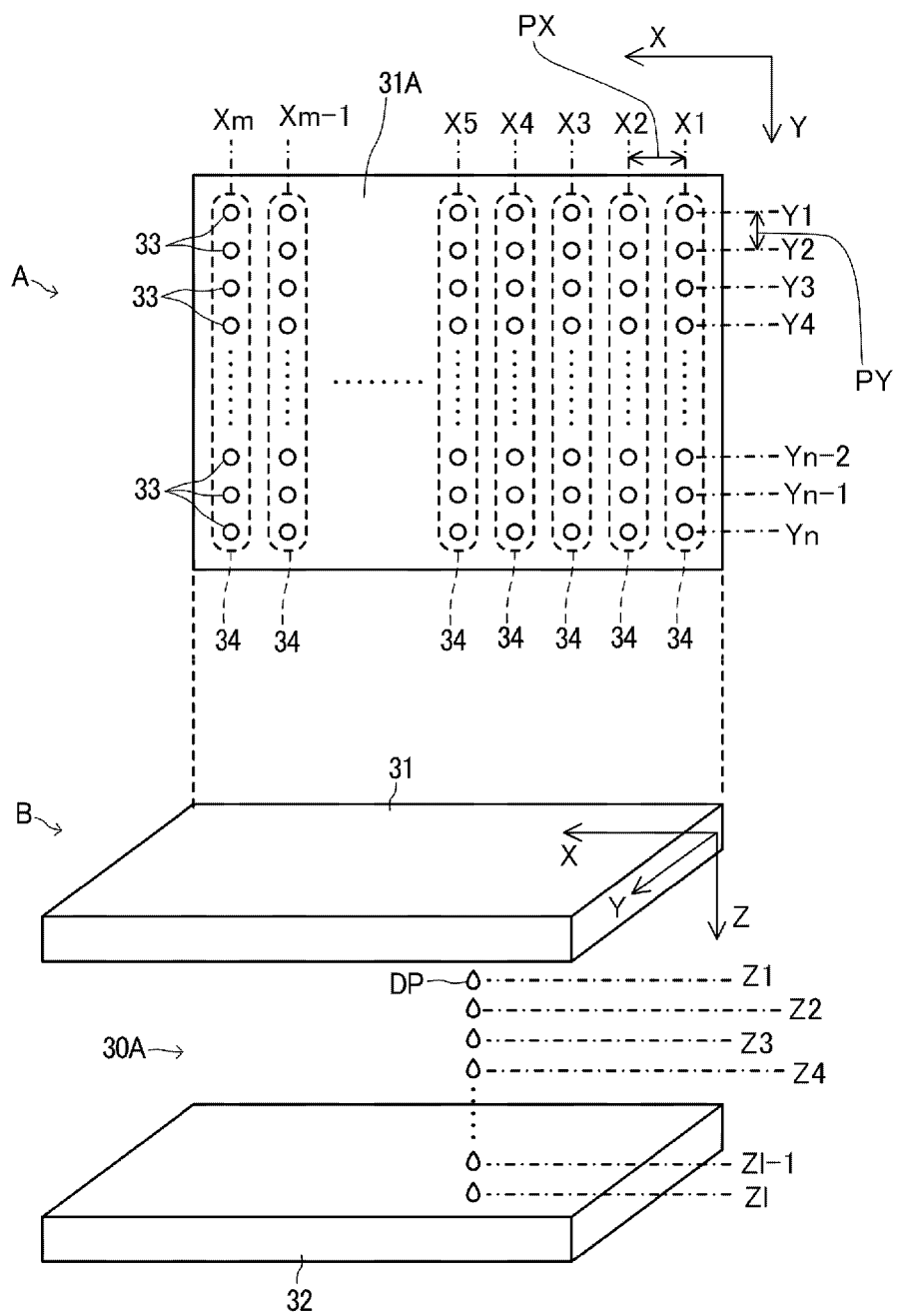
FIG. 4 is a diagram showing the configuration of an ejection head.

FIG. 4 is a diagram showing the configuration of the ejection head 31. The configuration of a nozzle disposition surface 31A is indicated by a sign A and a height position in the ejection space 30A is indicated by a sign B.

A plurality of nozzles 33 are disposed side by side in the X-axis direction and the Y-axis direction on the nozzle disposition surface 31A. The respective nozzles 33 are ejection ports for ejecting the droplets DP. The nozzles 33 are coupled to a not-shown liquid ejecting mechanism incorporated in the ejection head 31. The liquid pushed out by the liquid ejecting mechanism reaches the nozzles 33 and is ejected as the droplets DP. Examples of the liquid ejecting mechanism include a mechanism for energizing a piezoelectric element to thereby push out the liquid, a mechanism for heating and expanding the liquid to thereby push out the liquid, and a mechanism for generating air bubbles by heating to push out the liquid. The liquid ejecting mechanism may include a pressurizing mechanism for pressurizing the liquid and a valve that opens and closes a channel of the liquid.

The plurality of nozzles 33 lined in the Y-axis direction form a nozzle row 34. A pitch PY among the nozzles 33 in the nozzle row 34 is constant. The positions of the nozzles 33 in the Y-axis direction are represented as Y1, Y2, Y3, . . . , and Yn; n is the number of the nozzles 33 included in one nozzle row 34 and is any natural number.

A plurality of nozzle rows 34 are disposed side by side in the X-axis direction on the nozzle disposition surface 31A. A pitch PX of the nozzle rows 34 in the X-axis direction is constant. The positions of the nozzle rows 34 in the X-axis direction are represented as X1, X2, X3, . . . , and Xm; m is the number of the nozzle rows 34 disposed on the nozzle disposition surface 31A and is any natural number.

The respective nozzles 33 of the ejection head 31 can be specified by the positions X1, X2, X3, . . . , and Xm in the X-axis direction and the positions Y1, Y2, Y3, . . . , and Yn in the Y-axis direction. These positions can also be referred to as X coordinates and Y coordinates in the ejection space 30A.

In the following explanation, the positions of the droplets DP in the Z-axis direction are indicated by positions Z1, Z2, Z3, . . . , and Zl in the Z-axis direction. l is any natural number. The positions Z1, Z2, Z3, . . . , and Zl can also be referred to as Z coordinates in the ejection space 30A.

Therefore, the positions of the droplets DP in the ejection space 30A can be specified by X coordinates, Y coordinates, and Z coordinates of the nozzles 33 that eject the droplets DP.

1-2. Control System of the Projection System 1

Figure 5:
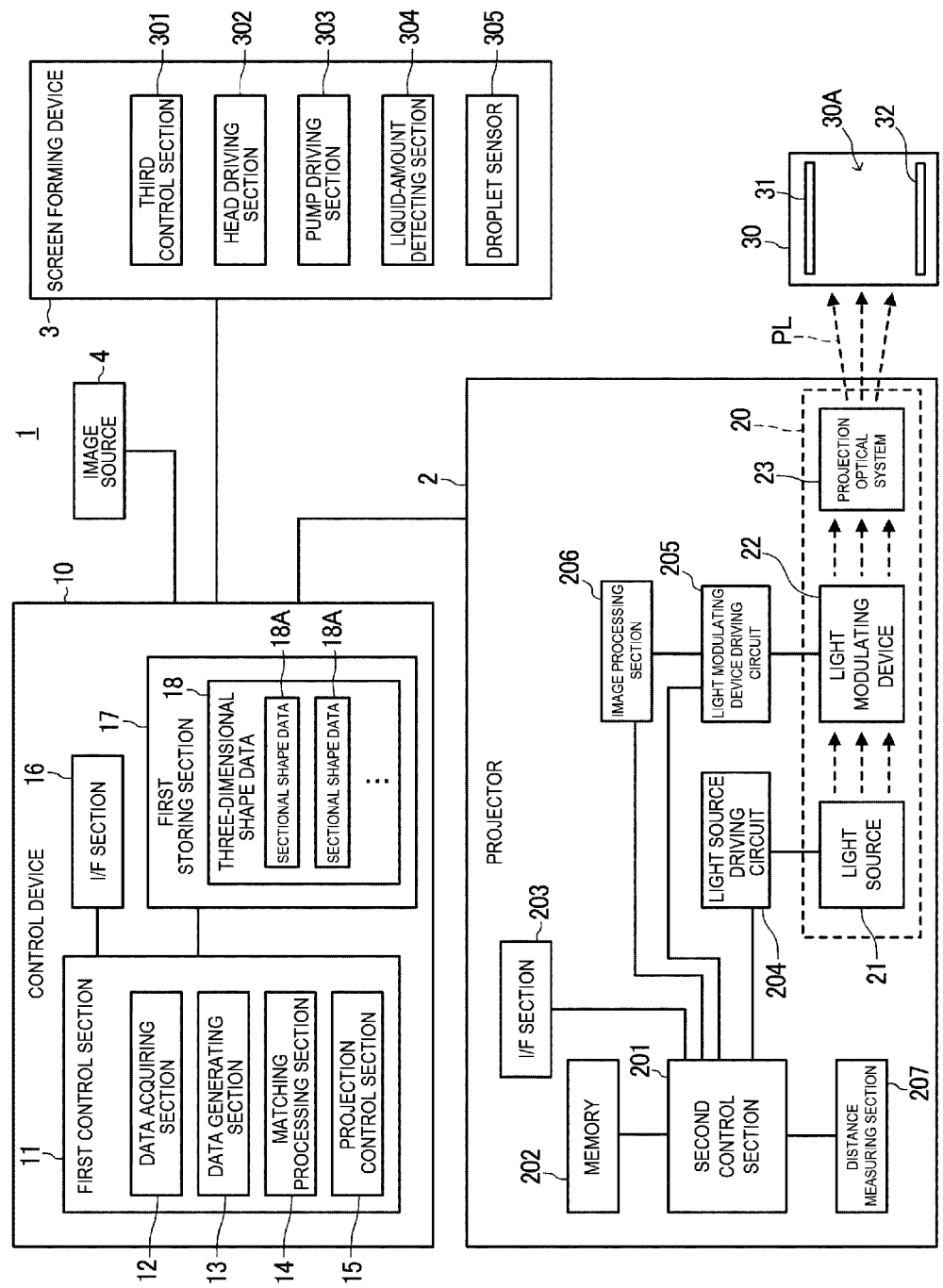
FIG. 5 is a block diagram showing a functional configuration of the projection system.

FIG. 5 is a block diagram showing a functional configuration of the projection system 1.

As shown in FIG. 5, the control device 10 is coupled to each of the projector 2 and the screen forming device 3. The coupling of the control device 10 and the projector 2 and the coupling of the control device 10 and the screen forming device 3 may be, for example, wired connection via a data communication cable or may be wireless connection using a wireless data communication line.

The control device 10 includes a first control section 11, an interface section 16, and a first storing section 17. The first control section 11 includes a processor such as a CPU (Central Processing Unit) or a microcomputer and a not-shown ROM (Read Only Memory). The first control section 11 executes, with the processor, a program stored in the ROM and realizes a data processing function and a control function for the projection system 1 through cooperation of software and hardware. The first storing section 17 is a storage device that stores, in a nonvolatile manner, a program to be executed by the first control section 11, data to be processed by the first control section 11, and the like.

The interface section 16 couples an external device of the control device 10 and the control device 10 to be capable of communicating data. The interface section 16 may be a communication device that executes wired data communication via a cable. The interface section 16 may be a wireless communication device. The projector 2, the screen forming device 3, and an image source 4 are coupled to the interface section 16.

The image source 4 is a device that supplies data concerning the stereoscopic image TP projected by the projection system 1. Examples of the image source 4 include a personal computer, a tablet computer, a smartphone, a disk-type recording media playing device, and a data storage.

The first control section 11 includes a data acquiring section 12, a data generating section 13, a matching processing section 14, and a projection control section 15. These sections are functional components realized by the program explained above.

The data acquiring section 12 acquires data concerning the stereoscopic image TP projected by the projection system 1. In this embodiment, the data acquiring section 12 acquires three-dimensional shape data input to the interface section 16 from the image source 4.

The data generating section 13 generates sectional shape data based on the three-dimensional shape data acquired by the data acquiring section 12.

The matching processing section 14 performs matching processing for projecting, in the ejection space 30A, a plane image FP based on the sectional shape data generated by the data generating section 13. Details of the matching processing are explained below.

The projection control section 15 controls the projector 2 and the screen forming device 3 according to a result of the matching processing executed by the matching processing section 14 to project the stereoscopic image TP in the ejection space 30A.

The projector 2 includes a second control section 201 that controls the sections of the projector 2 and a projecting section 20. The projector 2 performs formation of an optical image with the projecting section 20 and projects the image light PL. The projecting section 20 corresponds to an example of the display section.

The projecting section 20 includes a light source 21, a light modulating device 22, and a projection optical system 23. The projecting section 20 corresponds to an example of the display section. A light source driving circuit 204 and a light modulating device driving circuit 205 that operate according to the control by the second control section 201 are coupled to the projecting section 20.

The projector 2 includes an image processing section 206 that processes an image and an interface section 203.

The light source 21 includes a lamp such as a halogen lamp, a xenon lamp, or an ultrahigh pressure mercury lamp or a solid state light source such as an LED (Light Emitting Diode) or a laser light source. The light source 21 may include a reflector and an auxiliary reflector that guide light generated by a light source to the light modulating device 22. Further, the light source 21 may include a lens group and a polarizing plate for improving an optical characteristic of projected light, a dimming element that reduces a light amount of the light emitted by the light source on a path leading to the light modulating device 22, or the like. The light source driving circuit 204 lights and extinguishes the light source of the light source 21 according to the control by the second control section 201.

The light modulating device 22 includes a light modulating element and modulates light emitted by the light source 21 to generate image light. The light modulating device 22 includes, as the light modulating element, for example, a panel 221 on which a plurality of display elements are arranged in a matrix shape. The panel 221 is, for example, a transmission-type liquid crystal display panel or a reflection-type liquid crystal display panel but may be a digital micromirror device. The light modulating device 22 may include three panels 221 corresponding to the three primary colors of R, and B. In this case, the light modulating device 22 includes a combination optical system that combines color lights modulated by the three panels 221. The light modulating device 22 may be configured to modulate the color lights of the three colors of R, and B with one panel 221.

In this embodiment, an example is explained in which the panel 221 on which pixels are arranged along the Y axis and the Z axis orthogonal to each other as shown in FIG. 2 is used. In this example, the pixels on the panel 221 are specified by Y coordinates and Z coordinates. A Y-Z plane of the panel 221 corresponds to an image plane orthogonal to the optical axis PAX. The panel 221 includes a plurality of pixels, forms an image using the plurality of pixels, and modulates, with the pixels, light emitted by the light source 21.

The light modulating device 22 is driven by the light modulating device driving circuit 205. The light modulating device driving circuit 205 is coupled to the image processing section 206. Image data corresponding to the primary colors of R, and B are input to the light modulating device driving circuit 205 from the image processing section 206. The light modulating device driving circuit 205 drives the pixels of the panel 221 based on the input image data and draws an image on the panel 221.

The projection optical system 23 includes optical components such as a lens and a mirror and projects the image light PL modulated by the light modulating device 22 toward the screen forming section 30. The projection optical system 23 may include a zoom mechanism and a focus adjustment mechanism.

The image processing section 206 includes a not-shown frame memory as a temporary storage region for image processing. The frame memory is configured by, for example, an SDRAM (Synchronous Dynamic Random Access Memory).

Image data is input to the image processing section 206 from the control device 10 according to the control by the second control section 201. The image data is, for example, sectional shape data for projecting the plane image FP. The image processing section 206 develops the input image data in the frame memory. The image processing section 206 performs, on the image data developed in the frame memory, various image processing such as resolution conversion processing or resize processing, correction of a distortion aberration, shape correction processing, digital zoom processing, and image adjustment processing for adjusting a tint and luminance of an image.

The image processing section 206 can be configured by an integrated circuit such as an LSI, an ASIC (Application Specific Integrated Circuit), a PLD (Programmable Logic Device), or an SoC (System-on-a-chip).

The second control section 201 includes a processor such as a CPU or a microcomputer and is coupled to a memory 202. The memory 202 is a storage device that stores programs and data in a nonvolatile manner. The second control section 201 executes, with the processor, a program stored in the memory 202 and executes a control function for the projector 2 through cooperation of software and hardware.

The second control section 201 causes the image processing section 206 to execute image processing based on image data input to the interface section 203. The second control section 201 controls the light source driving circuit 204 and the light modulating device driving circuit 205 and causes to display by using the projecting section 20 an image based on the image data processed by the image processing section 206.

The projector 2 includes a distance measuring section 207. The second control section 201 measures the distance from the projector 2 to the screen forming section 30 using the distance measuring section 207.

The screen forming device 3 includes a third control section 301, a head driving section 302, a pump driving section 303, a liquid-amount detecting section 304, and a droplet sensor 305.

The third control section 301 includes a processor such as a CPU or a microcomputer and controls the sections of the screen forming device 3. The third control section 301 includes, for example, a not-shown ROM and executes a program stored in the ROM to thereby realize a control function for the screen forming device 3 through cooperation of software and hardware.

The head driving section 302 drives a not-shown ejecting mechanism included in the ejection head 31 and ejects the droplets DP from the nozzles 33 selected out of the nozzles 33 included in the ejection head 31.

The pump driving section 303 drives the pumps 353 and 354 included in the liquid supply system 35. The liquid-amount detecting section 304 detects an amount of liquid stored in the sub-tank 355 as explained above.

The droplet sensor 305 is a sensor that detects that the droplets DP ejected from the ejection head 31 arrive at the collection unit 32.

1-3. Detection of a Projection Environment

A detecting operation executed before the projection system 1 projects the stereoscopic image TP is explained.

Figure 6:
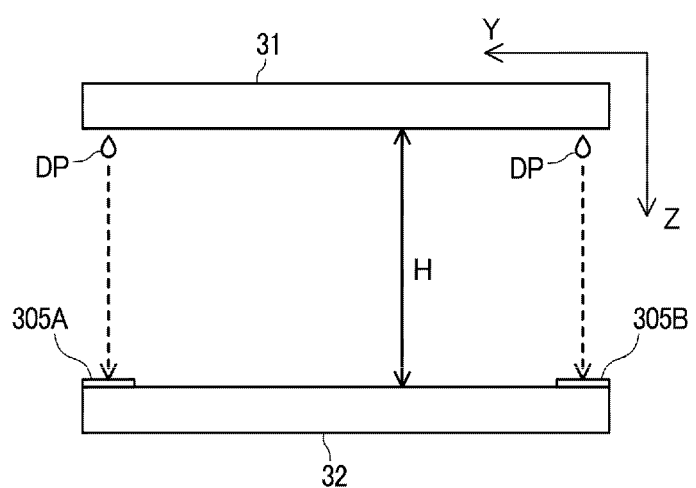
FIG. 6 is an explanatory diagram of an operation for detecting the heights of an ejection space.
Figure 7:
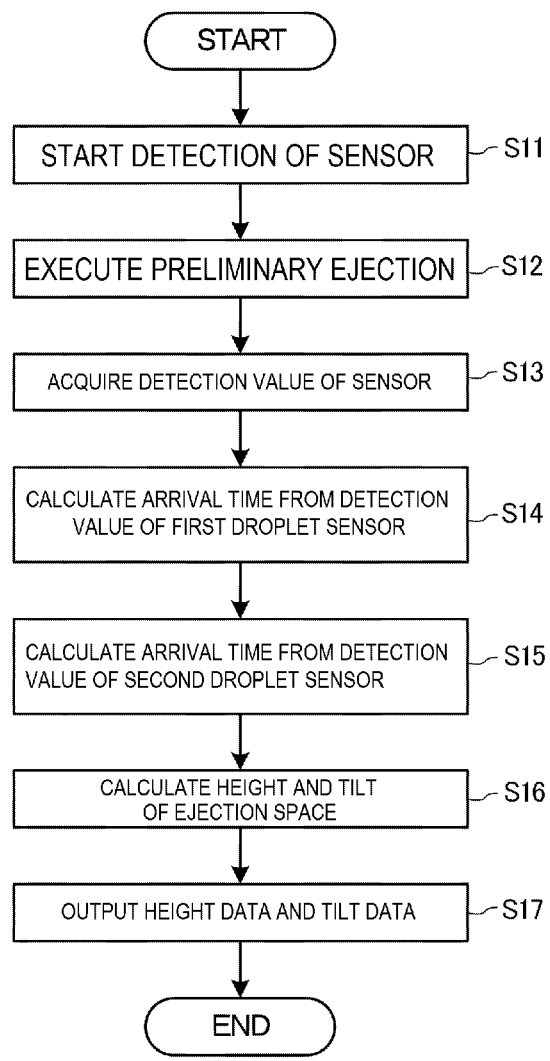
FIG. 7 is a flowchart showing height detection processing.

FIG. 6 is an explanatory diagram of an operation for detecting the height of the ejection space 30A. FIG. 7 is a flowchart showing height detection processing executed by the projection system 1.

In the collection unit 32, a first droplet sensor 305A and a second droplet sensor 305B configuring the droplet sensor 305 are disposed. The first droplet sensor 305A detects that the droplets DP ejected from the ejection head 31 arrive at the collection unit 32. The same applies to the second droplet sensor 305B. The first droplet sensor 305A and the second droplet sensor 305B are configured by, for example, a pressure sensor or a capacitance-type sensor. The first droplet sensor 305A and the second droplet sensor 305B are preferably set in different positions in the X-axis direction or the Y-axis direction. The first droplet sensor 305A and the second droplet sensor 305B are more preferably set at both ends of the collection unit 32 in the X-axis direction or the Y-axis direction. For example, the first droplet sensor 305A and the second droplet sensor 305B can be set right under the nozzles 33 at both ends included in the same nozzle row 34.

An arriving time of the droplets DP from the ejection head 31 to the collection unit 32 can be calculated by calculating a time difference between timing when the droplets DP are ejected from the ejection head 31 and timing when the first droplet sensor 305A detects the arrival of the droplets DP. The distance between the ejection head 31 and the collection unit 32 in the position of the first droplet sensor 305A, that is, height H of the ejection space 30A can be calculated from the arrival time. Similarly, the screen forming device 3 can calculate the height H of the ejection space 30A in the position of the second droplet sensor 305B.

The operation shown in FIG. 7 is executed according to the control by the third control section 301. Specifically, the control device 10 outputs, to the screen forming device 3, control data for instructing execution of the height detection processing and the third control section 301 executes the operation shown in FIG. 7 according to the control data.

The third control section 301 starts detection by the first droplet sensor 305A and the second droplet sensor 305B (step S11) and executes preliminary ejection from the ejection head 31 (step S12). The preliminary ejection indicates an ejecting operation not affecting projection of an image and indicates that ejection is performed for height detection. In step S12, the third control section 301 ejects the droplets DP from the nozzles 33 located right above the first droplet sensor 305A and the nozzles 33 located right above the second droplet sensor 305B.

The third control section 301 acquires detection values of the first droplet sensor 305A and the second droplet sensor 305B (step S13). The third control section 301 calculates an arrival time of the droplets DP from the detection value of the first droplet sensor 305A (step S14). The third control section 301 calculates an arrival time of the droplets DP from the detection value of the second droplet sensor 305B (step S15).

The third control section 301 calculates the height H of the ejection space 30A based on the arrival times respectively calculated in steps S14 and S15 and further calculates a tilt of the ejection space 30A (step S16). Specifically, the third control section 301 calculates the tilt of the ejection space 30A by calculating a difference between the height H in the position of the first droplet sensor 305A and the height H in the position of the second droplet sensor 305B. The third control section 301 calculates height of the ejection space 30A based on the height H in the position of the first droplet sensor 305A and the height H in the position of the second droplet sensor 305B. For example, the third control section 301 sets, as the height of the ejection space 30A, an average of the height H in the position of the first droplet sensor 305A and the height H in the position of the second droplet sensor 305B.

The third control section 301 generates height data indicating the height of the ejection space 30A and tilt data indicating the tilt of the ejection space 30A and outputs the height data and the tilt data to the control device 10 (step S17).

The third control section 301 may calculate, based on the tilt data generated in step S17, correction data for correcting ejection timings of the plurality of nozzles 33. For example, when the droplets DP are ejected from the plurality of nozzles 33 disposed side by side in the Y-axis direction, the third control section 301 may provide, for each of the nozzles 33, a time difference in timing for ejecting the droplets DP such that the droplets DP simultaneously arrive at the collection unit 32. The third control section 301 may calculate, as a correction parameter, data associating the time difference and the position of the nozzle 33 and may output the calculated correction parameter to the control device 10.

Figure 8:
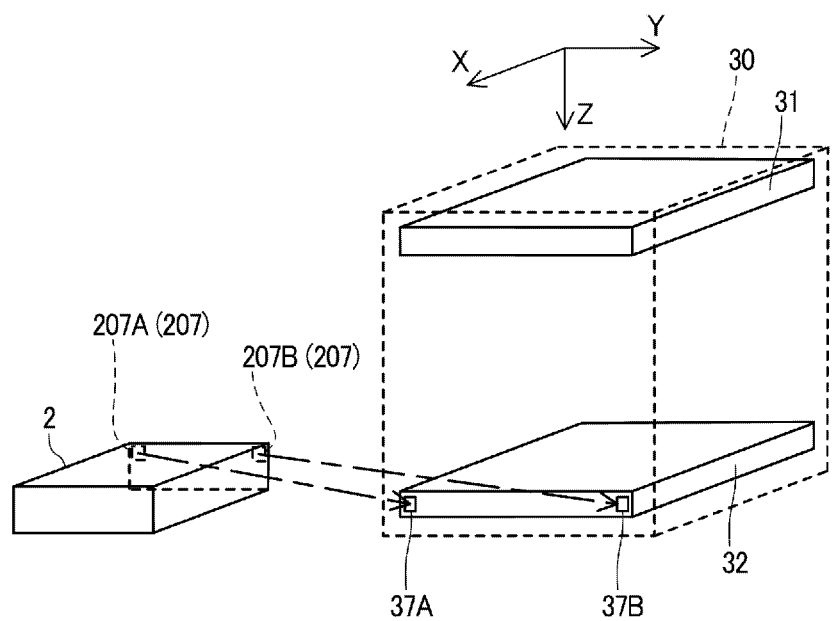
FIG. 8 is an explanatory diagram of an operation for detecting a projection distance.
Figure 9:
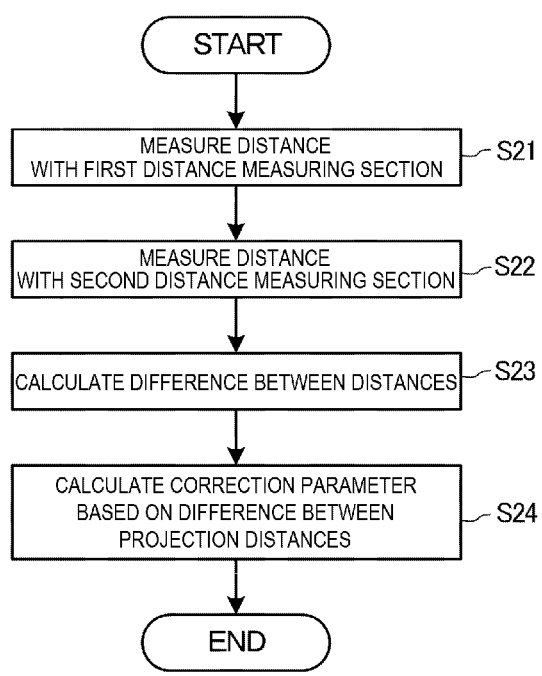
FIG. 9 is a flowchart showing a projection distance detection processing.

FIG. 8 is an explanatory diagram of an operation for detecting a projection distance. FIG. 9 is a flowchart showing projection distance detection processing.

The projector 2 includes a first distance measuring section 207A and a second distance measuring section 207B configuring the distance measuring section 207. In this embodiment, the first distance measuring section 207A is a distance measurement sensor of a TOF (Time Of Flight) type and includes a detection light source that emits detection light and a light reception sensor that receives reflected light of the detection light. For example, a laser light source is adopted as the detection light source. Like the first distance measuring section 207A, the second distance measuring section 207B includes a detection light source and a light reception sensor. As the first distance measuring section 207A and the second distance measuring section 207B, a publicly-known distance measurement sensor capable of optically detecting a distance can be used. The first distance measuring section 207A and the second distance measuring section 207B may be a distance measuring device that performs distance measurement using ultrasound.

In the collection unit 32, a first reflecting section 37A and a second reflecting section 37B that reflect the detection light are disposed. The first reflecting section 37A is a mirror including a reflecting material that reflects the detection light of the first distance measuring section 207A and the detection light of the second distance measuring section 207B and made of, for example, metal, glass, or synthetic resin. The same applies to the second reflecting section 37B.

The first reflecting section 37A and the second reflecting section 37B are disposed on a surface opposed to the projector 2 in the screen forming section 30. In this embodiment, the first reflecting section 37A and the second reflecting section 37B are disposed in the collection unit 32. The first reflecting section 37A and the second reflecting section 37B are preferably disposed in different positions in the Y-axis direction.

The operation shown in FIG. 9 is executed according to the control by the second control section 201. Specifically, the control device 10 outputs, to the projector 2, control data for instructing execution of the distance detection processing and the second control section 201 executes the operation shown in FIG. 9 according to the control data.

The second control section 201 executes the distance detection by the first distance measuring section 207A (step S21). In step S21, the second control section 201 causes a light source of the first distance measuring section 207A to emit light, acquires a detection value of a light reception sensor of the first distance measuring section 207A, and calculates a distance from the first distance measuring section 207A to the first reflecting section 37A. The second control section 201 executes the distance detection by the second distance measuring section 207B (step S22). In step S22, the second control section 201 causes a light source of the second distance measuring section 207B to emit light, acquires a detection value of a light reception sensor of the second distance measuring section 207B, and calculates a distance from the second distance measuring section 207B to the second reflecting section 37B. The second control section 201 may execute the operation in step S21 and the operation in step S22 simultaneously or in parallel or may execute the operations in the opposite order.

The second control section 201 calculates a difference between the distance measured by the first distance measuring section 207A and the distance measured by the second distance measuring section 207B (step S23). When there is the difference between the distances calculated in step S23, the projector 2 is not right opposed to the screen forming section 30. That is, an angle of a Y-Z plane of the screen forming section 30 with respect to the optical axis PAX of the projector 2 is not a right angle. The second control section 201 calculates a correction parameter based on the difference calculated in step S23 (step S24). The correction parameter calculated in step S24 may be a parameter for changing, according to the position of the screen forming section 30, a direction of the image light PL projected by the projecting section 20, that is, an angle of the optical axis PAX. The correction parameter may be a parameter for performing geometrical correction of a projected image of the projector 2. The second control section 201 or the control device 10 may output, to a user who operates the projection system 1, a message or data for informing the user to adjust setting positions of the projector 2 and/or the screen forming device 3.

1-4. Operation of the Projection System 1

Figure 10:
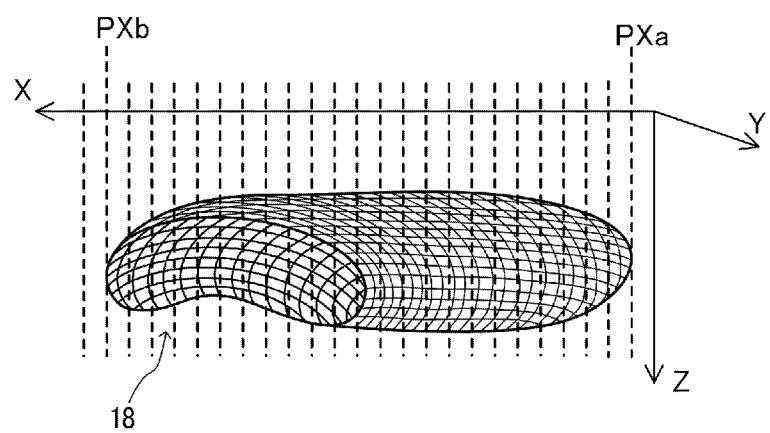
FIG. 10 is an explanatory diagram of sectional image data generation processing.
Figure 10:
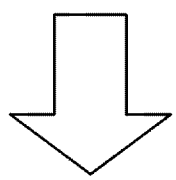
Figure 10:
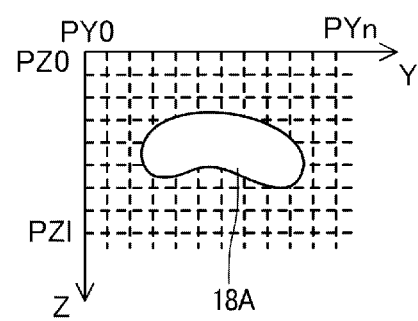
Figure 11:
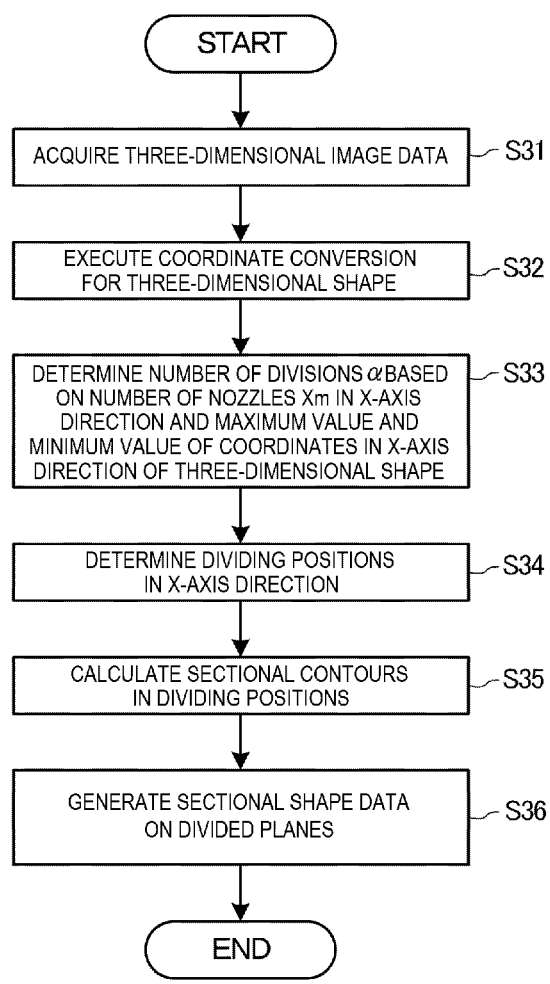
FIG. 11 is a flowchart showing the sectional image data generation processing.

FIG. 10 is an explanatory diagram of sectional image data generation processing executed by the control device 10. FIG. 11 is a flowchart showing the sectional image data generation processing.

The control device 10 acquires three-dimensional shape data 18 from the image source 4 and generates sectional shape data 18A from the three-dimensional shape data 18. An example of the three-dimensional shape data 18 is shown in FIG. 10. The three-dimensional shape data 18 is data representing a cubic shape. A data format of the three-dimensional shape data 18 is not limited. The three-dimensional shape data 18 may be, for example, STL data or OBJ data. The control device 10 converts the three-dimensional shape data 18 into, for example, coordinate data in an X-Y-Z orthogonal coordinate system as shown in FIG. 10.

The control device 10 generates the sectional shape data 18A from the three-dimensional shape data 18. The sectional shape data 18A is plane image data of a cutting plane obtained by cutting the three-dimensional shape data 18 in any position in the X-axis direction. The sectional shape data 18A is represented as, for example, a figure in a Y-Z plane and formed by a Y coordinate and a Z coordinate. The projection system 1 forms, with the droplets DP, a plurality of screens in different X coordinates and projects a plurality of sectional shape data 18A onto the screens in X coordinates corresponding to the respective sectional shape data 18A to thereby display a stereoscopic image such that the user can visually recognize the stereoscopic image.

As shown in FIG. 11, the control device 10 acquires the three-dimensional shape data 18 with the data acquiring section 12 (step S31). The three-dimensional shape data 18 acquired in step S31 is stored in the first storing section 17.

Subsequently, the control device 10 executes, with the data generating section 13, coordinate conversion for the three-dimensional shape data 18 (step S32). In step S32, the data generating section 13 associates the X axis with the three-dimensional shape data 18. That is, the data generating section 13 specifies a relative direction of the three-dimensional shape data 18 with respect to the optical axis PAX of the projector 2 and arranges the three-dimensional shape data 18 according to the X axis. It is optional to decide in which direction the three-dimensional shape data 18 is displayed with respect to a projecting direction of the projector 2. The data generating section 13 associates the X axis with the three-dimensional shape data 18 in a direction designated by the user operating the control device 18 or a direction designated in advance. Further, the data generating section 13 associates the Y axis and the Z axis orthogonal to the X axis with the three-dimensional shape data 18. The data generating section 13 converts a coordinate on the surface of the three-dimensional shape data 18 into a coordinate in the X-Y-Z coordinate system. For example, the data generating section 13 specifies positions on the surface of the three-dimensional shape data 18 formed by polygons and calculates coordinates of the specified positions on the surface. In step S32, the data generating section 13 may perform enlargement, reduction, deformation, and the like of the three-dimensional shape data 18.

It is also optional to decide in which positions in the Y-axis direction and the Z-axis direction the three-dimensional shape data 18 is arranged. The data generating section 13 arranges, in the Y-axis direction and the Z-axis direction as well, the three-dimensional shape data 18 in positions designated by the user operating the control device 10 or positions designated in advance. For example, the data generating section 13 may arrange the three-dimensional shape data 18 to be closest to the X axis. The data generating section 13 may arrange the three-dimensional shape data 18 such that the center of the three-dimensional shape data 18 overlaps a predetermined Y coordinate and a predetermined Z coordinate.

The data generating section 13 determines, based on a number m of the nozzle rows 34 in the X-axis direction and a maximum value and a minimum value of X coordinates of the three-dimensional shape data 18 for which coordinate conversion is performed, the number of divisions α for dividing the three-dimensional shape data 18 in the X-axis direction (step S33).

For example, the minimum value of the X coordinates of the three-dimensional shape data 18 shown in FIG. 10 is PXa and the maximum value of the X coordinates is PXb. The data generating section 13 determines the number of divisions α such that a range PXa-PXb of the X coordinate can be equally or appropriately allocated to m nozzle rows 34.

The data generating section 13 determines, based on the number of divisions α determined in step S33 and the maximum value and the minimum value of the X coordinates of the three-dimensional shape data 18, positions where the three-dimensional shape data 18 is divided (step S34). In step S34, X coordinates of the dividing positions are calculated.

The data generating section 13 calculates sectional contours of the three-dimensional shape data 18 in the X coordinates determined in step S34 (step S35) and generates the sectional shape data 18A of the calculated sectional contour (step S36).

The operation shown in FIG. 11 is an example. As processing for generating sectional shape data from three-dimensional shape data with processing including coordinate conversion, for example, a publicly-known method disclosed in JP-A-2000-339465 can be adopted.

Figure 12:
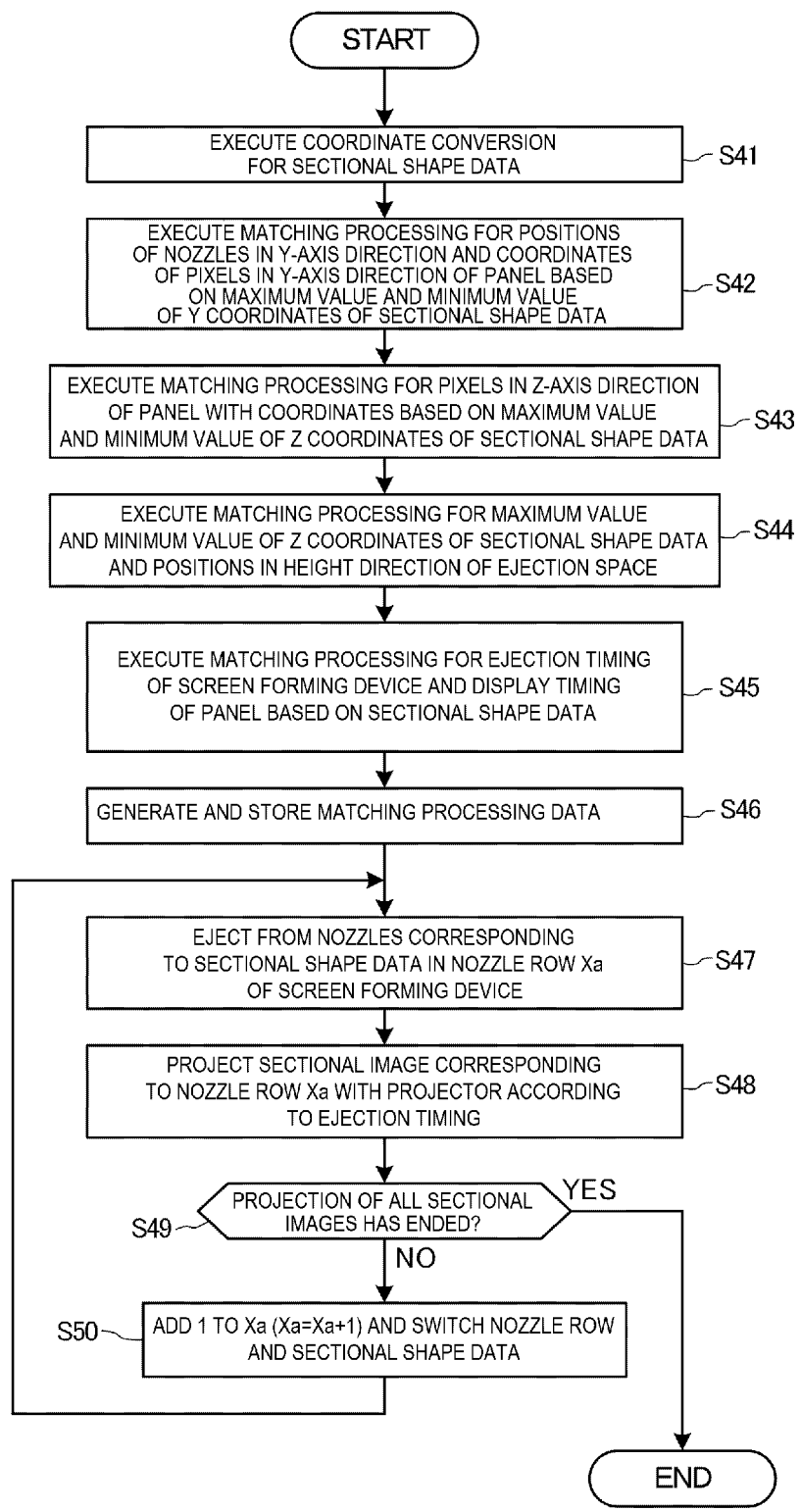
FIG. 12 is a flowchart showing an operation of a projection system in a first embodiment.
Figure 13:
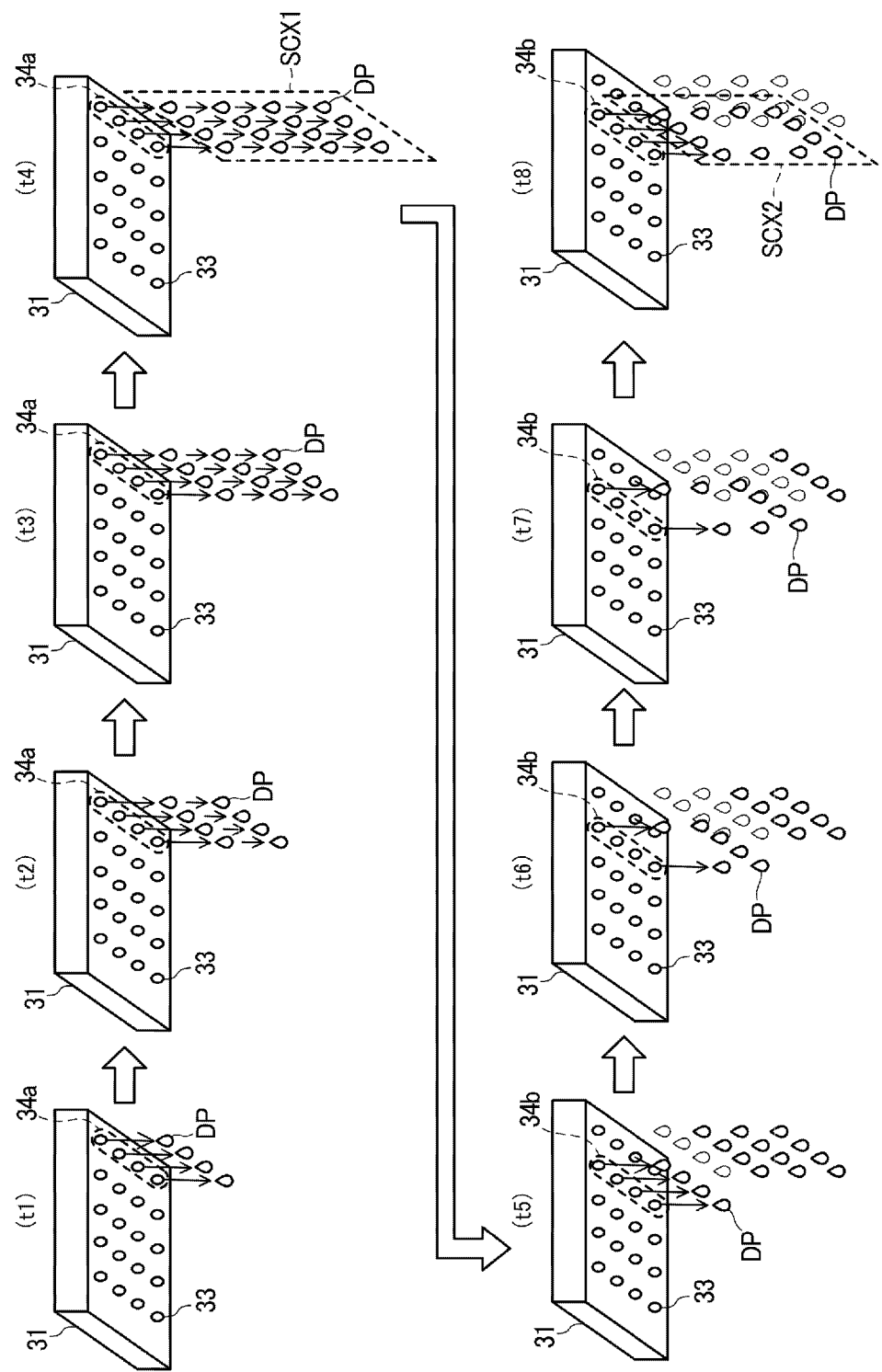
FIG. 13 is an explanatory diagram showing an operation example of a screen forming device in the first embodiment.

FIG. 12 is a flowchart showing the operation of the projection system 1 in the first embodiment. FIG. 13 is an explanatory diagram showing an operation example of the screen forming device 3 in the first embodiment.

The operation explained with reference to FIGS. 12 and 13 is executed by the first control section 11 following the operation explained with reference to FIGS. 10 and 11.

The data generating section 13 performs coordinate conversion for the sectional shape data 18A and converts the sectional shape data 18A into data of a plane image including a Y coordinate and a Z coordinate (step S41). Consequently, for example, as shown in FIG. 10, the sectional shape data 18A is converted into data of a plane image on a Y-Z plane. The sectional shape data 18A converted in step S41 is stored in the first storing section 17.

Subsequently, the matching processing section 14 executes, based on the maximum value and the minimum value of Y coordinates of the sectional shape data 18A, matching processing for the positions of the nozzles 33 in the Y-axis direction and coordinates of the pixels in the Y-axis direction of the panels 221 (step S42). In step S42, matching for associating the pixels of the panel 221 and Y coordinates of the sectional shape data 18A is performed. Consequently, pixels for displaying an image of the sectional shape data 18A on the panel 221 are determined in the Y-axis direction. In step S42, matching for associating the positions of the nozzles 33 in the Y-axis direction and Y coordinates of the sectional shape data 18A is performed. Consequently, the positions in the Y-axis direction of the droplets DP involved in the display of the sectional shape data 18A can be specified. That is, the nozzles 33 for ejecting the droplets DP in order to display the sectional shape data 18A are determined.

The matching processing section 14 executes matching processing for pixels in the Z-direction of the panel 221 with coordinates based on a maximum value and a minimum value of Z coordinates of the sectional shape data 18A (step S43). Consequently, matching for associating the pixels of the panel 221 and the Z coordinates of the sectional shape data 18A is performed. Therefore, pixels for displaying an image of the sectional shape data 18A on the panel 221 are determined in the Z-axis direction.

The matching processing section 14 executes matching processing for the maximum value and the minimum value of the Z coordinates of the sectional shape data 18A and positions in the height H direction of the ejection space 30A (step S44). Consequently, it is possible to specify positions in the Z-axis direction of the droplets DP at the time when the sectional shape data 18A is displayed by the screen forming section 30.

The matching processing section 14 executes, based on the sectional shape data 18A, matching processing for ejection timing of the screen forming device 3 and display timing of the panel 221 (step S45). Specifically, the matching processing section 14 determines, based on the Z coordinates of the sectional shape data 18A and the positions in the Z-axis direction of the droplets DP matched in step S44, timing for drawing an image of the sectional shape data 18A on the panel 221 and ejection timing of the droplets DP for each of the nozzles 33.

The matching processing section 14 generates matching processing data indicating results of the matching in steps S42 to S45 and causes the first storing section 17 to store the matching processing data (step S46).

Subsequently, the control device 10 displays a stereoscopic image based on three-dimensional shape data. That is, the control device 10 causes the projector 2 to execute projection of an image and causes the screen forming device 3 to execute formation of a screen. The projection control section 15 may control the projector 2 and the screen forming device 3 to execute an operation explained below. The projection control section 15 may transmit data necessary for display processing to the projector 2 and the screen forming device 3. The second control section 201 and the third control section 301 may respectively execute processing.

According to the control by the control device 10, the nozzle row 34 in an Xa position among the nozzle rows 34 of the ejection head 31 lined in the X-axis direction is selected by the head driving section 302. The head driving section 302 ejects the droplets DP once or a plurality of times from the nozzles 33 present in a position corresponding to the sectional shape data 18A in the Y-axis direction among the nozzles 33 forming the selected nozzle row 34 (step S47).

Subsequently, at timing when a screen is formed by the droplets DP ejected from the nozzles 33, a sectional image corresponding to the nozzle row Xa is projected by the projector 2 (step S48).

The control device 10 determines whether projection of all sectional images forming the three-dimensional shape data 18, that is, images based on all the sectional shape data 18A has ended (step S49). When the projection of all the sectional images has ended (YES in step S49), the control device 10 ends the processing.

When the projection of the sectional images has not ended (NO in step S49), the control device 10 adds 1 to Xa (Xa=Xa+1), switches the nozzle row 34 and the sectional shape data 18A (step S50), and returns to step S47.

By repeatedly executing steps S47 to S50 by the number of the sectional shape data 18A forming the three-dimensional shape data 18, the three-dimensional shape data 18 is projected to the ejection space 30A.

The operation in steps S47 to S50 in FIG. 12 is explained with reference to a specific example.

An operation example shown in FIG. 13 indicates an example in which the ejection head 31 ejects the droplets DP to form the screens SCX1 and SCX2. In FIG. 13, states of the ejection head 31 and the droplets DP at times t1, t2, and t8 are schematically shown. In FIG. 13, for convenience of understanding, an example is shown in which the numbers of the nozzles 33 and the nozzle rows 34 included in the ejection head 31 are simplified. The same applies to FIGS. 27, 28, and 29 referred to below.

At the time t1, the screen forming device 3 selects a nozzle row 34a close to the origin in the X-axis direction and ejects the droplets DP from the nozzles 33 forming the nozzle row 34a. Subsequently, at the time t2, the screen forming device 3 also ejects the droplets DP from the nozzle row 34a. An interval between the time t2 and the time t1 is determined based on the positions of the droplets DP in the height direction of the ejection space 30A matched in steps S44 and S45. Thereafter, the ejection interval of the droplets DP is the same until the time t8.

The screen forming device 3 also ejects the droplets DP from the nozzles 33 of the nozzle row 34a at the times t3 and t4. Consequently, at the time t4, the screen SCX1 is formed by the droplets DP ejected continuously four times to below the nozzle row 34a. The projector 2 draws an image on the panel 221 at the time t4 and projects the image light PL to the ejection space 30A, whereby an image is formed on the screen SCX1.

At the time t5, the screen forming device 3 ejects the droplets DP from a nozzle row 34b adjacent to the nozzle row 34a. Subsequently, at the time t6, the screen forming device 3 also ejects the droplets DP from the nozzle row 34b.

The screen forming device 3 ejects the droplets DP from the nozzles 33 corresponding to the sectional shape data 18A among the nozzles 33 included in the nozzle row 34b. Accordingly, at the time t6, a part of the nozzles 33 forming the nozzle row 34b eject the droplets DP. Thereafter, at the times t7 and t8, the screen forming device 3 also ejects the droplets DP from the nozzle row 34b.

As a result, at the time t8, the screen SCX2 is formed below the nozzle row 34b. The projector 2 draws an image on the panel 221 at the time t8 and projects the image light PL to the ejection screen 30A, whereby an image is formed on the screen SCX2.

A stereoscopic image having depth in the X-axis direction is formed by a sectional image displayed on the screen SCX1 at the time t4 and a sectional image displayed on the screen SCX2 at the time t8.

Further, an image displayed by the operation in steps S47 to S50 in FIG. 12 is explained with reference to a specific example.

Figure 14:
FIG. 14 is a diagram showing an example of a sectional image projected by the projection system.
Figure 14:
Figure 15:
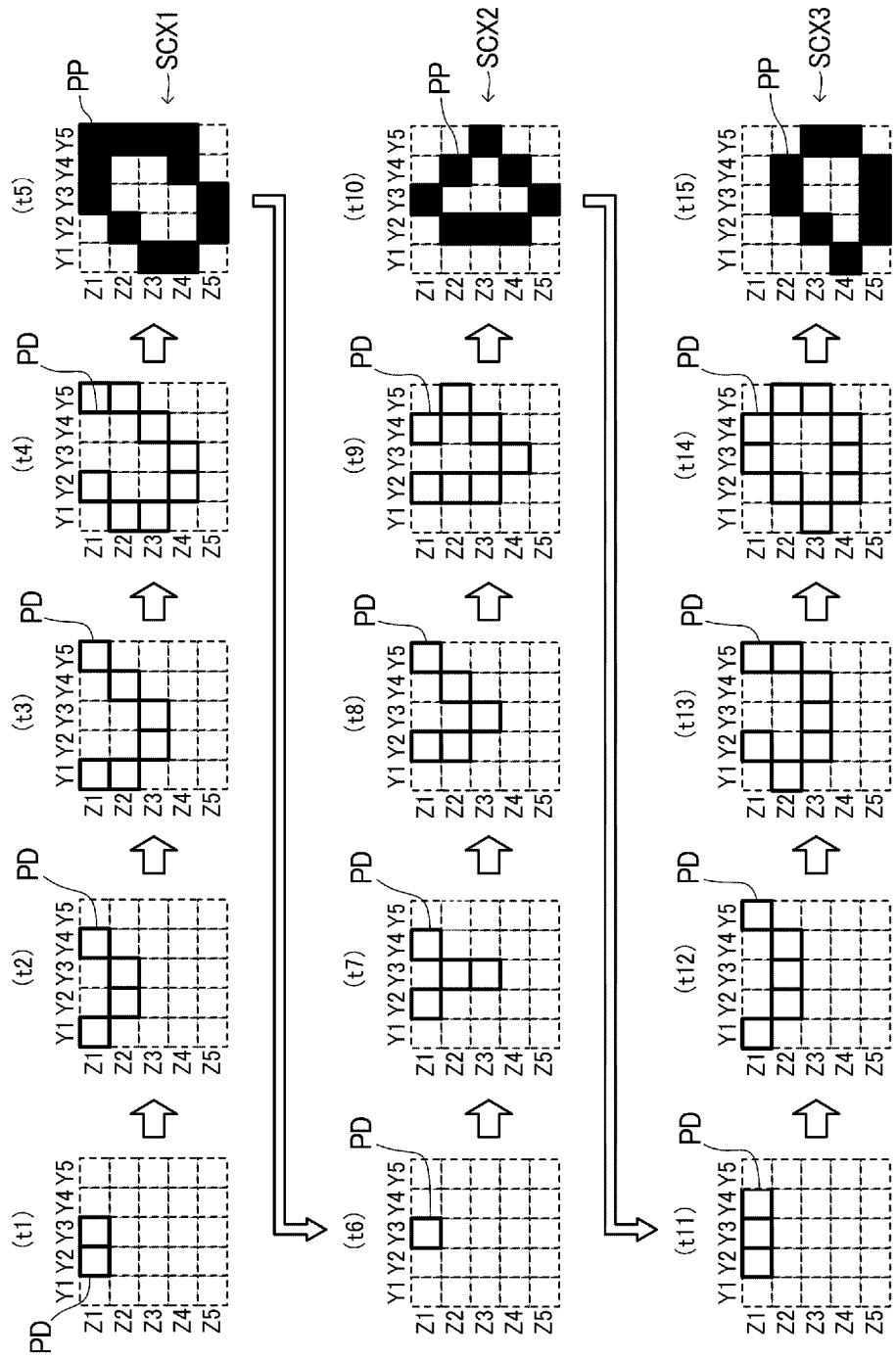
FIG. 15 is an explanatory diagram showing transition of a projection state in the first embodiment.

FIG. 14 is a diagram showing an example of a sectional image projected by the projection system 1. FIG. 15 is an explanatory diagram showing transition of a projection state in the first embodiment.

In the following explanation, an example is explained in which the plane images FP1, FP2, and FP3 are displayed as images based on the sectional shape data 18A forming the three-dimensional shape data 18. The plane images FP1, FP2, and FP3 are an example of the sectional image explained above. The plane image FP1 is an image corresponding to the sectional shape data 18A in a position where the X coordinate is the smallest in the ejection head 31. The plane image FP3 is an image corresponding to the sectional shape data 18A in a position where the X coordinate is larger than the X coordinate in the plane image FP1. The plane image FP2 is an image corresponding to the sectional shape data 18A located between the plane image FP1 and the plane image FP3.

FIG. 15 is a front view of the ejection space 30A viewed in the X-axis direction and shows a Y-Z plane located in an X coordinate of the nozzle row 34. Y1, Y2, Y3, Y4, and Y5 indicate Y coordinates and correspond to the positions of the nozzles 33 in the Y-axis direction. Z1, Z2, Z3, Z4, and Z5 indicate Z coordinates and correspond to positions in the height direction of the droplets DP.

In FIG. 15, an example is shown in which the nozzle row 34 includes five nozzles 33 lined in the Y-axis direction and the positions of the droplets DP are classified into five stages in the height direction of the ejection space 30A. This example is an example in which the numbers of the nozzles 33 and the droplets DP are reduced for convenience of understanding and does not limit the configuration of the present disclosure. The same applies to FIGS. 17, 19, 21, 23, and 25 referred to below.

In FIG. 15, the positions of the droplets DP on the Y-Z plane are denoted by a sign PD and indicated by a thick frame. Portions where the droplets DP are irradiated with the image light PL of the projector 2 on the Y-Z plane are indicated by black-painted regions denoted by a sign PP.

In FIG. 15, timing when the droplets DP ejected by the ejection head 31 reach a coordinate Z1 is represented as time t1. Display states at times t2, t3, . . . , and t15 are shown. At the times t1 to t5, a Y-Z plane corresponding to an X coordinate of the plane image FP1 is shown. At the times t6 to t10, a Y-Z plane corresponding to an X coordinate of the plane image FP2 is shown. At the times t11 to t15, a Y-Z plane corresponding to an X coordinate of the plane image FP3 is shown.

In this example, at timings of the times t1 to t5, the droplets DP are ejected from the nozzles 33 corresponding to pixels forming the plane image FP1. Accordingly, at the time t5, the droplets DP are present in positions corresponding to the pixels of the plane image FP1 and the screen SCX1 matched to the shape of the plane image FP1 is formed. At the time t5, the projector 2 projects the image light PL onto the screen SCX1.

At timings of the times t6 to t10, the droplets DP are ejected from the nozzles 33 corresponding to pixels forming the plane image FP2. Accordingly, at the time t10, the droplets DP are present in positions corresponding to the pixels of the plane image FP2 and the screen SCX2 matched to the shape of the plane image FP2 is formed. At the time t10, the projector 2 projects the image light PL onto the screen SCX2.

Similarly, at timings of the times t11 to t15, the droplets DP are ejected from the nozzles 33 corresponding to pixels forming the plane image FP3. Accordingly, at the time t15, the droplets DP are present in positions corresponding to the pixels of the plane image FP3 and the screen SCX3 matched to the shape of the plane image FP3 is formed. At the time t15, the projector 2 projects the image light PL of the plane image FP3 onto the screen SCX3.

In the first embodiment, the projector 2 sequentially displays the plane images FP1, FP2, and FP3 at the times t5, t10, and t15. By repeatedly executing this operation by a necessary number, the screens SCX1, SCX2, ... are formed in order in the X-axis direction and sectional images are displayed. The sectional images achieve an afterimage effect in the screen forming section 30. The three-dimensional shape data 18 is stereoscopically visually recognized by the user.

A state in which the images are projected in the X coordinates of the plane images FP1, FP2, and FP3 is shown in FIG. 15. However, FIG. 15 is only a figure showing a part of the operation of the projection system 1. Accordingly, the projection system 1 is naturally capable of continuing the projection after the time t15 and is capable of forming screens in a larger number of X coordinates and projecting plane images. The same applies to FIGS. 17, 19, 21, 23, and 25.

1-5. Action Effects in the First Embodiment

As explained above, the projection system 1 applied with the present disclosure projects the image light PL onto the screen. The projection system 1 includes the screen forming device 3 including the plurality of nozzles 33. The screen forming device 3 forms a screen by ejecting liquid onto an optical path of the image light PL from the nozzles 33. The projection system 1 includes the projector 2 including the light source 21 and the light modulating device 22 that modulates light emitted by the light source 21 to form the image light PL. The projector 2 projects the image light PL onto the screen. The projection system 1 includes the control device 10 including the data generating section 13 that divides the three-dimensional shape data 18 to generate the sectional shape data 18A. The control device 10 controls the projector 2 and the screen forming device 3 based on the sectional shape data 18A. The nozzles 33 of the screen forming device 3 are disposed side by side on an X-Y plane extending along a direction of the X axis parallel to the optical axis PAX of the image light PL, which is a direction in which the screen corresponding to the sectional shape data 18A overlaps, and a direction of the Y axis crossing the X axis. The projector 2 includes the light modulating device 22 that forms an image using a plurality of pixels of the panel 221 and modulates, with the pixels, light emitted by the light source 21. The control device 10 includes the matching processing section 14 that correlates coordinates of the sectional shape data 18A, coordinates of the pixels of the panel 221, the nozzles 33 of the screen forming device 3, and heights of the ejection space 30A from the nozzles 33 in the Z-axis direction orthogonal to the X-Y plane.

With this configuration, the projector 2 can project the image light PL according to the positions of the droplets DP ejected to the ejection space 30A. Consequently, an image having cubic effect can be projected by projecting, with the projector 2, the image light PL onto the screen formed by the screen forming device 3 using the liquid.

In the projection system 1, the data generating section 13 divides the three-dimensional shape data 18 in the X-axis direction to thereby generate the sectional shape data 18A of a cross section orthogonal to the X axis. The matching processing section 14 performs matching processing about coordinates of the sectional shape data 18A. Therefore, it is possible to project the stereoscopic image TP having cubic effect using the sectional shape data 18A.

The screen forming device 3 drives the nozzles 33 in a unit of the nozzle row 34 including the plurality of nozzles 33 disposed side by side in the X-axis direction or the Y-axis direction. After forming a screen in the nozzle row 34 equivalent to one sectional shape data 18A, the screen forming device 3 forms another screen in the nozzle row 34 equivalent to another one sectional shape data 18A. Consequently, it is possible to form a plurality of screens in an array direction of the nozzle rows 34. Accordingly, by projecting the plane images FP onto the respective screens, it is possible to project the stereoscopic image TP rich in cubic effect as a whole.

The screen forming device 3 forms a screen by ejecting the liquid from the nozzles 33 associated with the coordinates forming the image of the sectional shape data 18A among the nozzles 33 included in the nozzle row 34. Accordingly, by projecting the image based on the sectional shape data 18A onto a screen formed in a position suitable for the sectional shape data 18A generated from the three-dimensional shape data 18, it is possible to project the stereoscopic image TP accurately reproducing the three-dimensional shape data 18.

After the screen forming device 3 forms the screen equivalent to the sectional shape data 18A, the projector 2 projects a sectional image based on the sectional shape data 18A. Consequently, it is possible to project the stereoscopic image TP more accurately reproducing the three-dimensional shape data 18.

The control device 10 according to the present disclosure is a device used in combination with the projector 2 that projects the image light PL and the screen forming device 3 that forms a screen by ejecting the liquid onto the optical path of the image light PL from the plurality of nozzles 33. The control device 10 includes the data generating section 13 that acquires the three-dimensional shape data 18 formed by the three-dimensional coordinate system having the X axis, the Y axis, and the Z axis orthogonal to one another and divides the three-dimensional shape data 18 to generate the sectional shape data 18A. The control device 10 includes the matching processing section 14 that correlates coordinates of the sectional shape data 18A, pixels with which the projector 2 draws an image, the nozzles 33 of the screen forming device 3, and heights in the ejection space 30A of liquid ejected from the nozzles 33. Consequently, it is possible to generate the sectional shape data 18A from the three-dimensional shape data 18 and associate the coordinates of the sectional shape data 18A, coordinates of the pixels of the panel 221, the nozzles 33 of the screen forming device 3, and heights of the ejection space 30A in the Z-axis direction. Accordingly, it is possible to project the image light PL according to the positions of the droplets DP ejected to the ejection space 30A and form an image. Consequently, it is possible to project an image having cubic effect by projecting, with the projector 2, the image light PL onto the screen formed by the screen forming device 3 using the liquid.

An image projection method according to the present disclosure is an image projection method for projecting an image using the screen forming device 3 and the projector 2 that draws an image using the plurality of pixels of the panel 221 and projects the image light PL modulated by the pixels onto a screen. In the image projection method, the three-dimensional shape data 18 formed by the three-dimensional coordinate system having the X axis, the Y axis, and the Z axis orthogonal to one another is acquired and the three-dimensional shape data 18 is divided in the X-axis direction to generate the sectional shape data 18A. In the image projection method, coordinates of the sectional shape data 18A are acquired. Matching processing for correlating the coordinates of the sectional shape data 18A, pixels with which the projector 2 draws an image, the nozzles 33 of the screen forming device 3, and heights in the ejection space 30A of the liquid ejected from the nozzles 33 is executed. The pixels of the panel 221 and the nozzles 33 of the screen forming device 3 are driven based on the sectional shape data 18A and according to the correlation by the matching processing to project an image onto the screen. With the image projection method, the coordinates of the sectional shape data 18A generated from the three-dimensional shape data 18, the coordinates on the panel 221, the nozzles 33 of the screen forming device 3, and the heights of the ejection space 30A in the Z-axis direction are associated. Accordingly, it is possible to project an image having cubic effect by projecting, with the projector 2, the image light PL onto the screen formed by the screen forming device 3 using the liquid.

The projection system 1 according to the present disclosure includes the projector 2 including the light source 21 and the light modulating device 22 that modulates light emitted by the light source 21 to form the image light PL. The projector 2 projects the image light PL. The projection system 1 includes the screen forming device 3 including the plurality of nozzles 33 disposed side by side in the first direction along the optical path of the image light PL and the second direction crossing the first direction. The screen forming device 3 forms a screen by ejecting liquid onto the optical path of the image light PL from the nozzles 33. The projection system 1 includes the control device 10 that controls the projector 2 and the screen forming device 3 based on the sectional shape data 18A obtained by dividing the three-dimensional shape data 18. The control device 10 causes the projector 2 to project the image light PL of an image based on the sectional shape data 18A. The control device 10 controls, based on the sectional shape data 18A, timing for ejecting the liquid from the plurality of nozzles 33 disposed side by side in the second direction. The control device 10 performs control for matching timing for ejecting the liquid from the plurality of nozzles 33 lined in the first direction with timing when the projector 2 switches the sectional shape data 18A. Consequently, it is possible to project an image having cubic effect by projecting, with the projector 2, the image light PL according to the positions of the droplets DP on the screen formed by the screen forming device 3 using the liquid.

In the configuration explained above, matching processing data generated as a result of the matching processing executed by the matching processing section 14 may be transmitted from the control device 10 to the projector 2. The projector 2 may store the matching processing data in the memory 202. In this case, the memory 202 is equivalent to the storing section. The second control section 201 may control the projecting section 20 and the screen forming device 3 according to the matching processing data stored in the memory 202 and execute projection. That is, like the projection control section 15, the second control section 201 may cause the sections of the projector 2 and the screen forming device 3 to operate and may execute the formation of the screen and the projection of the image light PL.

In this case, in the projection system 1, when an axis parallel to a projecting direction of the projector 2 is represented as the X axis, an axis orthogonal to the X axis is represented as the Y axis, and an axis orthogonal to the X axis and the Y axis is represented as the Z axis, the screen forming device 3 includes the nozzles 33 disposed side by side in the X-axis direction and the Y-axis direction. The projector 2 includes the memory 202 that stores three-dimensional display formation data obtained by executing matching processing for correlating coordinates of the sectional shape data 18A obtained by dividing the three-dimensional shape data 18 in the X-axis direction with the pixels of the panel 221 and heights of the ejection space 30A in the Z-axis direction from the nozzles 33. The projection system 1 drives the panel 221 and the nozzles 33 of the screen forming device 3 based on the three-dimensional display formation data stored in the memory 202.

2. Second Embodiment

Figure 16:
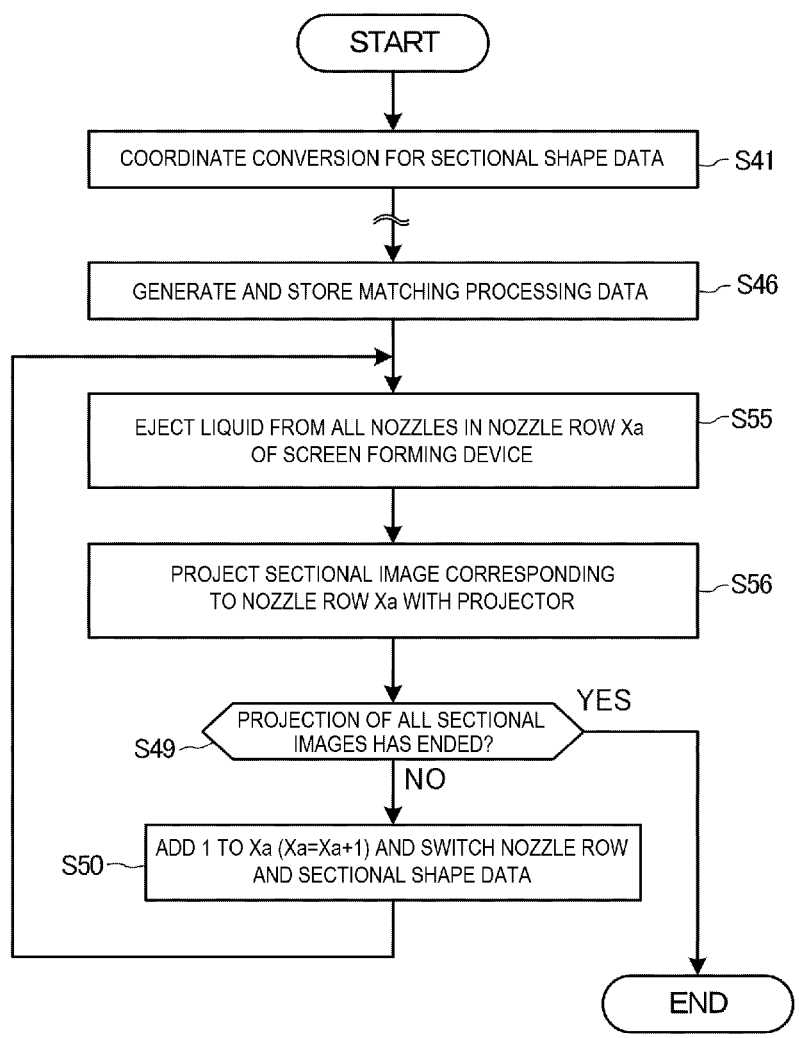
FIG. 16 is a flowchart showing the operation of a projection system in a second embodiment.
Figure 17:
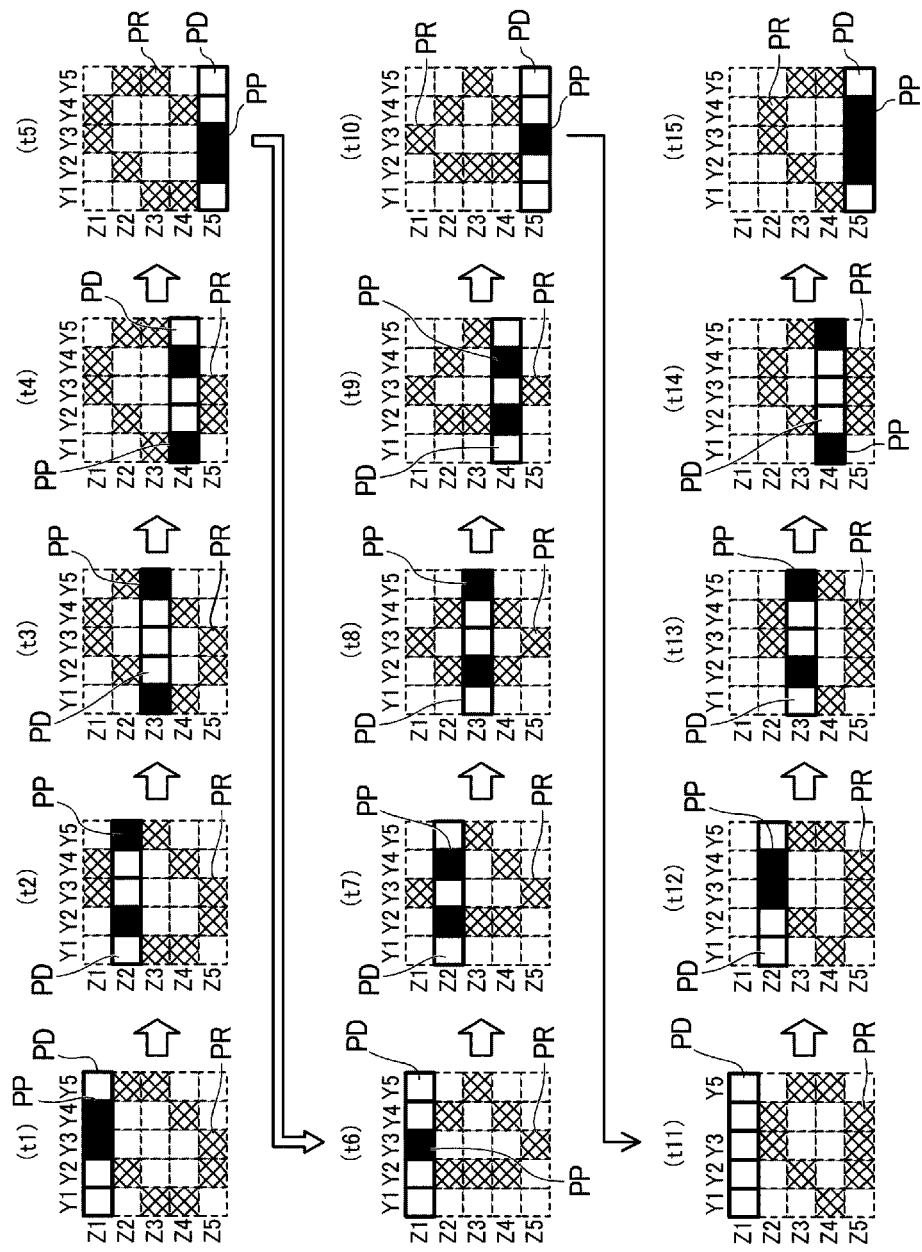
FIG. 17 is an explanatory diagram showing transition of a projection state in the second embodiment.

FIG. 16 is a flowchart showing the operation of the projection system 1 in a second embodiment. FIG. 17 is an explanatory diagram showing transition of a projection state in the second embodiment.

In the second embodiment, since the configuration of the projection system 1 is the same as the configuration explained in the first embodiment, illustration and explanation of the configuration are omitted.

In the operation shown in FIG. 16, steps S41 to S46 and steps S49 to S50 are common to FIG. 12.

The projection system 1 selects, according to the control by the control device 10, the nozzle rows 34 of the ejection head 31 lined in the X-axis direction with the head driving section 302. The head driving section 302 ejects the droplets DP once from all the nozzles 33 forming the selected nozzle row 34 (step S55). The projector 2 projects a sectional image corresponding to the nozzle row Xa (step S56).

Thereafter, the control device 10 shifts to step S49 and determines whether projection of all sectional images forming the three-dimensional shape data 18, that is, images based on all the sectional shape data 18A has ended (step S49). When the projection of all the sectional images has ended (YES in step S49), the control device 10 ends the processing. When the projection of the sectional images has not ended (NO in step S49), the control device 10 adds 1 to Xa (Xa=Xa+1), switches the nozzle row 34 and the sectional shape data 18A (step S50), and returns to step S55. By repeatedly executing steps S55, S56, S49, S50 by the number of the sectional shape data 18A forming the three-dimensional shape data 18, the three-dimensional shape data 18 is projected to the ejection space 30A.

Like FIG. 15, FIG. 17 is a front view of the ejection space 30A viewed in the X-axis direction and shows a Y-Z plane located in an X coordinate of the nozzle row 34. In FIG. 17, the positions of the droplets DP on the Y-Z plane are denoted by a sign PD and indicated by a thick frame. Portions where the droplets DP are irradiated with the image light PL of the projector 2 on the Y-Z plane are indicated by black-painted regions denoted by a sign PP. Parts where the image light PL of the projector 2 reaches the Y-Z plane, the parts being portions not irradiated with the droplets DP, are indicated by hatching with a sign PR.

In FIG. 17, as in FIG. 15, timing when the droplets DP ejected by the ejection head 31 reach the coordinate Z1 is represented as time t1. Display states at times t2, t3, . . . , and t15 are shown. At the times t1 to t5, a Y-Z plane corresponding to an X coordinate of the plane image FP1 is shown. At the times t6 to t10, a Y-Z plane corresponding to an X coordinate of the plane image FP2 is shown. At the times t11 to t15, a Y-Z plane corresponding to an X coordinate of the plane image FP3 is shown.

In an example shown in FIG. 17, the droplets DP are ejected from all the nozzles 33 included in the nozzle row 34 in the X coordinate corresponding to the plane image FP1. Accordingly, at the times t1 to t5, the droplets DP are lined in the coordinates of Y1 to Y5 and fall in the discharge space 30A.

The projector 2 starts projection of the image light PL of the plane image FP1 from the time t1 when the droplets DP reach a height position Z1 corresponding to a projection position of an image. The projection of the image light PL is continued until the time t5. In a position where the image light PL overlaps a height position of the droplets DP, the image light PL strikes the droplets DP as indicated by a sign PP and pixels of the plane image FP1 are visually recognized. At timings of the times t1 to t5, the pixels forming the plane image FP1 are visually recognized in each of height positions Z1 to Z5. In contrast, an image is not visually recognized in a position where the image light PL does not overlap the droplets DP.

At the times t6 to t10, in an X coordinate equivalent to a projection position of the plane image FP2, the droplets DP are ejected from all the nozzles 33 forming the nozzle row 34 and fall in the ejection space 30A. The projector 2 projects the image light PL of the plane image FP2 at the times t6 to t10. In a position where the image light PL overlaps a height position of the droplets DP, the image light PL strikes the droplets DP and pixels of the plane image FP2 are visually recognized. In this way, at respective timings of the times t6 to t10, the pixels forming the plane image FP2 are visually recognized in each of the height positions Z1 to Z5.

At the times t11 to t15, in an X coordinate equivalent to a projection position of the plane image FP3, the droplets DP are ejected from all the nozzles 33 forming the nozzle row 34 and fall in the ejection space 30A. The projector 2 projects the image light PL of the plane image FP3 at the times t11 to t15. At timings of the times t11 to t15, the pixels forming the plane image FP3 are visually recognized in each of the height positions Z1 to Z5.

According to the second embodiment, the same action effects as the action effects in the first embodiment are obtained.

The screen forming device 3 ejects the droplets DP from a plurality of nozzles 33 including the nozzles 33 not associated with coordinates forming an image of the sectional shape data 18A among the nozzles 33 included in the nozzle row 34 equivalent to the sectional shape data 18A and forms a screen.

Accordingly, for example, it is unnecessary to select the nozzles 33 in step S55. Therefore, there is an advantage that it is possible to simplify control of the projector 2 and the screen forming device 3 and efficiently project a stereoscopic image.

The projector 2 projects a sectional image based on the sectional shape data 18A according to timing when the screen forming device 3 ejects the droplets DP from the nozzle row 34 equivalent to the sectional shape data 18A.

Accordingly, timings when the projector 2 starts and switches the projection of the image light PL may be less. Therefore, there is an advantage that it is possible to simplify the control of the projector 2 and the screen forming device 3 and efficiently project a stereoscopic image.

3. Third Embodiment

Figure 18:
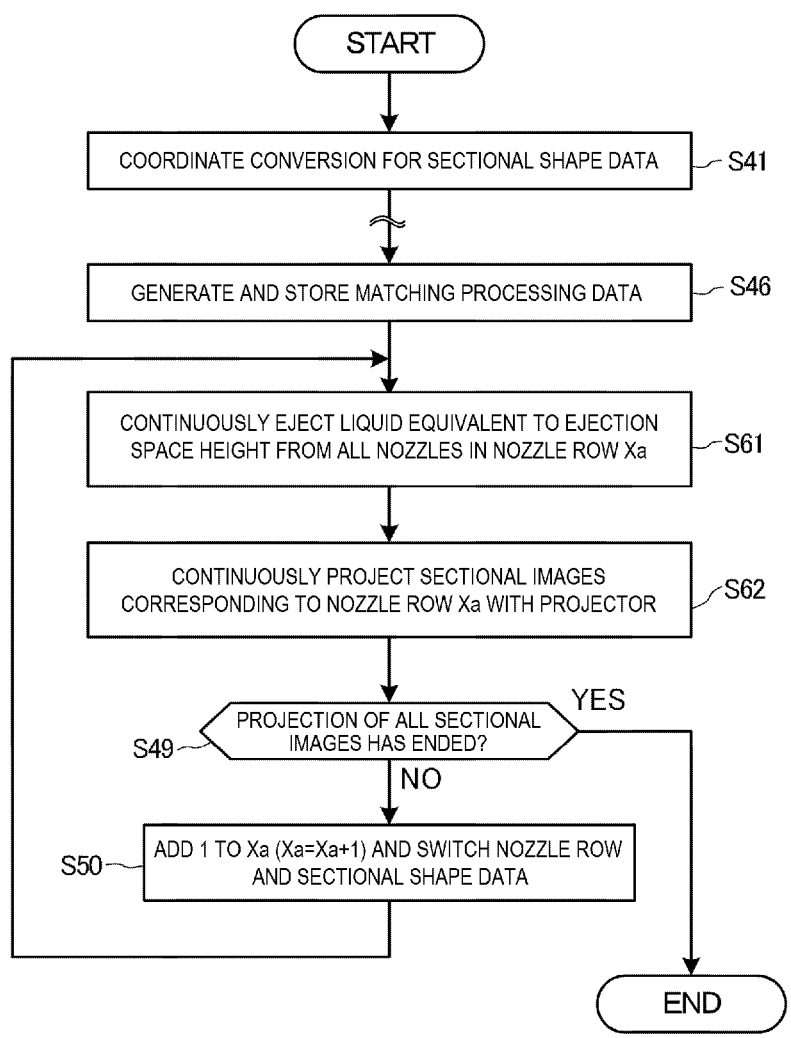
FIG. 18 is a flowchart showing the operation of a projection system in a third embodiment.
Figure 19:
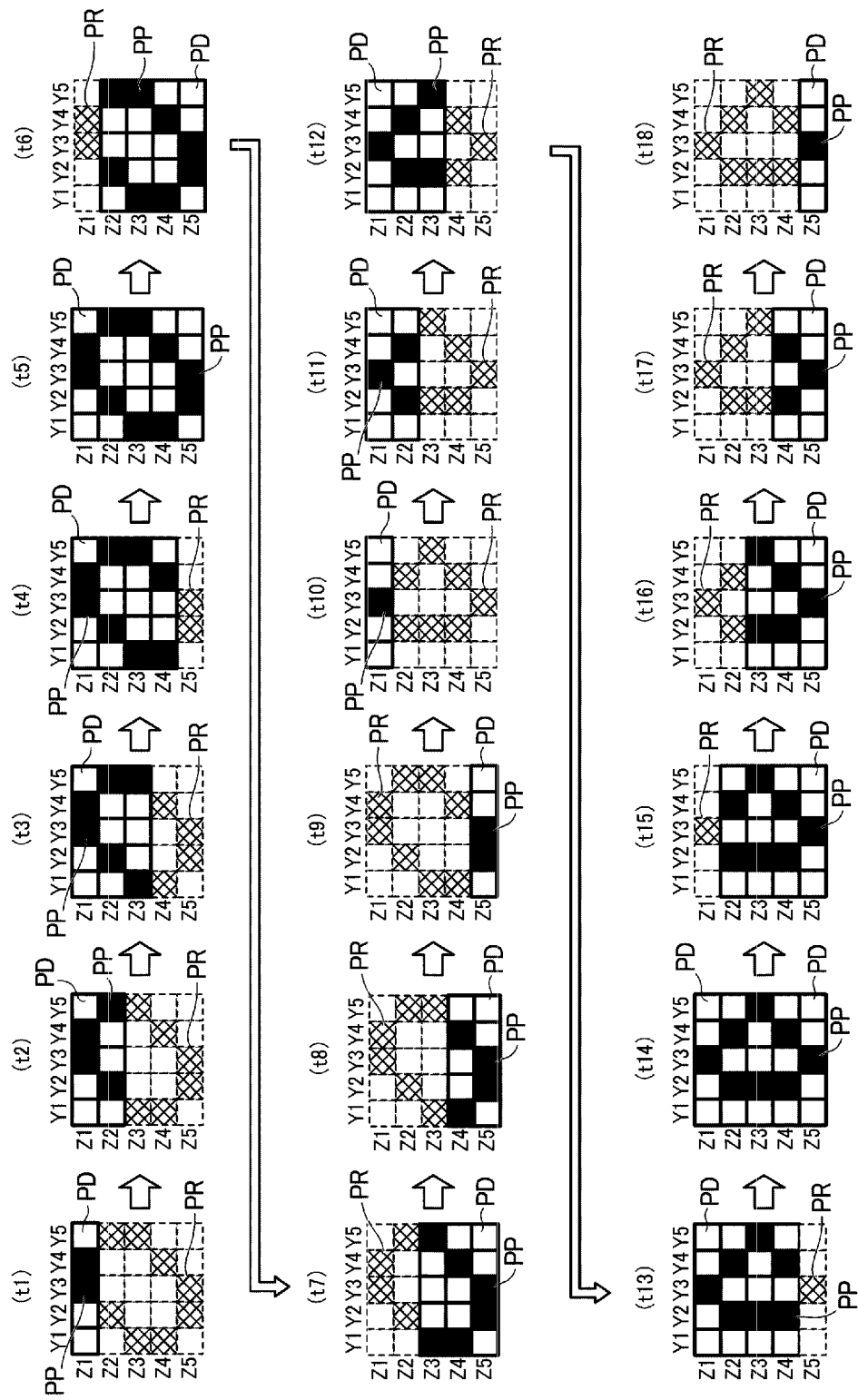
FIG. 19 is an explanatory diagram showing transition of a projection state in the third embodiment.

FIG. 18 is a flowchart showing the operation of the projection system 1 in a third embodiment. FIG. 19 is an explanatory diagram showing transition of a projection state in the third embodiment.

In the third embodiment, since the configuration of the projection system 1 is the same as the configuration explained in the first embodiment, illustration and explanation of the configuration are omitted.

In the operation shown in FIG. 18, steps S41 to S46 and steps S49 to S50 are common to FIG. 12.

The projection system 1 selects, according to the control by the control device 10, the nozzle row 34 out of the nozzle rows 34 of the ejection head 31 lined in the X-axis direction with the head driving section 302. The head driving section 302 continuously ejects the droplets DP a plurality of times from all the nozzles 33 forming the selected nozzle row 34 (step S61). The projector 2 projects a sectional image corresponding to the nozzle row Xa (step S62).

Thereafter, the control device 10 shifts to step S49 and determines whether projection of all sectional images forming the three-dimensional shape data 18, that is, images based on all the sectional shape data 18A has ended (step S49). When the projection of all the sectional images has ended (YES in step S49), the control device 10 ends the processing. When the projection of the sectional images has not ended (NO in step S49), the control device 10 adds 1 to Xa (Xa=Xa+1), switches the nozzle row 34 and the sectional shape data 18A (step S50), and returns to step S55. By repeatedly executing steps S61, S62, S49, S50 by the number of the sectional shape data 18A forming the three-dimensional shape data 18, the three-dimensional shape data 18 is projected to the ejection space 30A.

Like FIGS. 15 and 17, FIG. 19 is a front view of the ejection space 30A viewed in the X-axis direction and shows a Y-Z plane located in an X coordinate of the nozzle row 34. Positions and portions indicated by the signs PD, PP, and PR in FIG. 19 are common to FIG. 17.

In FIG. 19, as in FIG. 15, timing when the droplets DP ejected by the ejection head 31 reach the coordinate Z1 is represented as time t1. Display states at times t2, t3, . . . , and t18 are shown. At the times t1 to t9, a Y-Z plane corresponding to an X coordinate of the plane image FP1 is shown. At the times t10 to t18, a Y-Z plane corresponding to an X coordinate of the plane image FP2 is shown.

In an example shown in FIG. 19, the droplets DP are continuously ejected at a predetermined time interval from all the nozzles 33 included in the nozzle row 34 in the X coordinate corresponding to the plane image FP1. An ejection interval of the droplets DP is set in advance to correspond to a time in which the droplets DP fall between Z1 and Z2. The number of times of ejection of the droplets DP is set according to the number of Z coordinates on the Y-Z plane. In the example shown in FIG. 19, the droplets DP are continuously ejected five times from the nozzles 33 to correspond to the Z coordinates Z1 to Z5.

The projector 2 starts projection of the image light PL of the plane image FP1 from the time t1 when the droplets DP reach the height position Z1 corresponding to a projection position of an image. The projection of the image light PL is performed in a period when the droplets DP are present in the X coordinate corresponding to the plane image FP1 and, in the example shown in FIG. 19, continued until the time t9.

At the times t1 to t9, in a position where the image light PL overlaps a height position of the droplets DP, the image light PL strikes the droplets DP as indicated by the sign PP and pixels of the plane image FP1 are visually recognized. At timings of the times t1 to t9, the pixels forming the plane image FP1 are visually recognized in each of the height positions Z1 to Z5. In contrast, an image is not recognized in a position where the image light PL does not overlap the droplets DP.

At the times t10 to t18, in an X coordinate equivalent to a projection position of the plane image FP2, the droplets DP fall in the ejection space 30A. The projector 2 projects the image light PL of the plane image FP2 at the times t10 to t18. In a position where the image light PL overlaps a height position of the droplets DP, the image light PL strikes the droplets DP and pixels of the plane image FP2 are visually recognized. In this way, at timings of the times t10 to t18, the pixels forming the plane image FP2 are visually recognized in each of the height positions Z1 to Z5.

According to the third embodiment, the same action effects as the action effects in the first embodiment and the second embodiment are obtained.

Further, in the third embodiment, by continuously ejecting the droplets DP a plurality of times from the nozzles 33, it is possible to arrange a large number of the droplets DP on one Y-Z plane and clearly project the plane images FP1 and FP2. Since the image light PL is projected by the projector 2 in all periods when the droplets DP are present on the Y-Z plane, it is possible to cause a user to visually recognize an afterimage in a long period. Consequently, it is possible to cause the user to visually recognize the respective plane images FP forming the stereoscopic image TP. It is possible to project the stereoscopic image TP richer in cubic effect.

4. Fourth Embodiment

Figure 20:
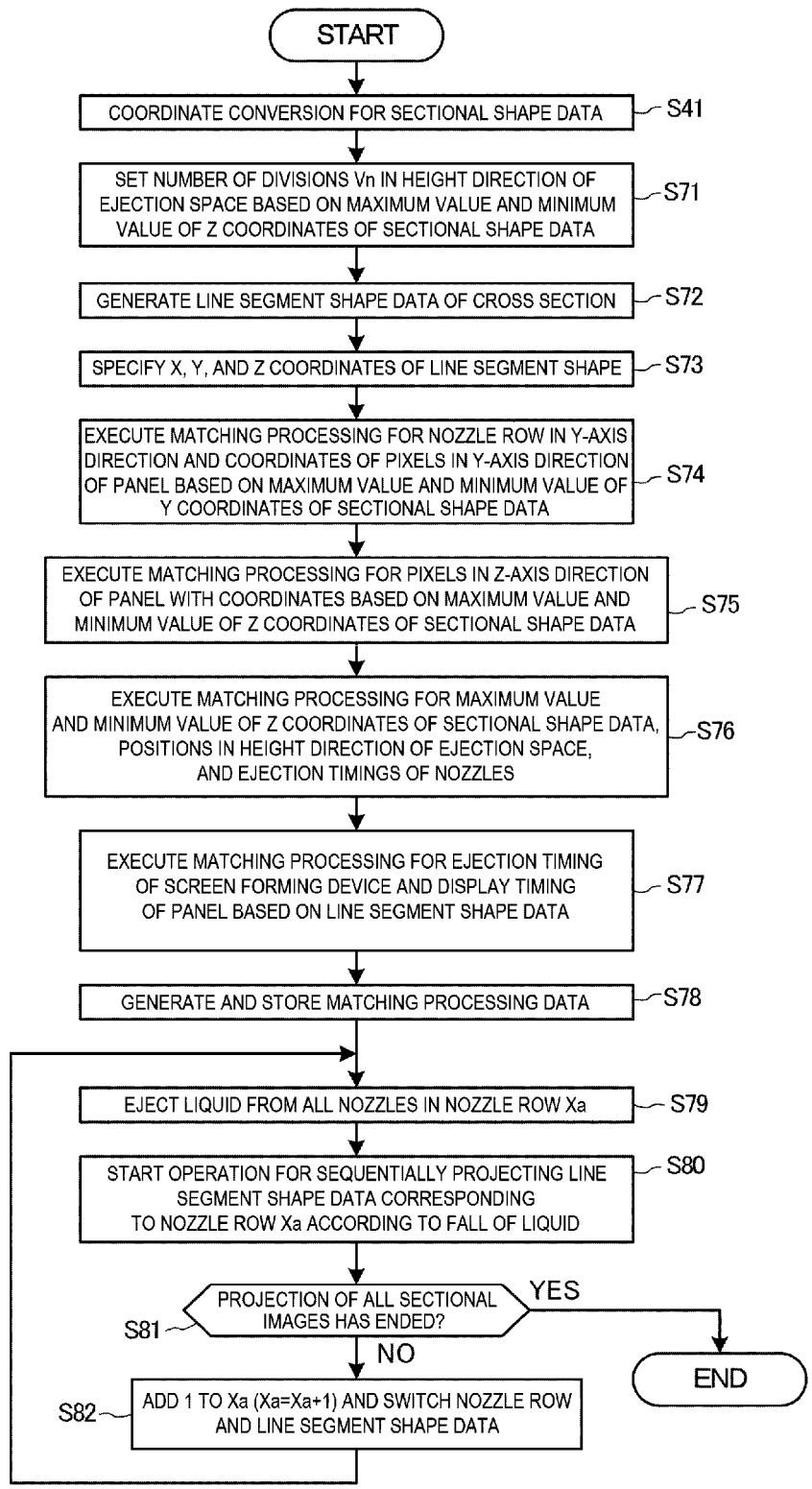
FIG. 20 is a flowchart showing the operation of a projection system in a fourth embodiment.
Figures 21A, 21B, 21C:
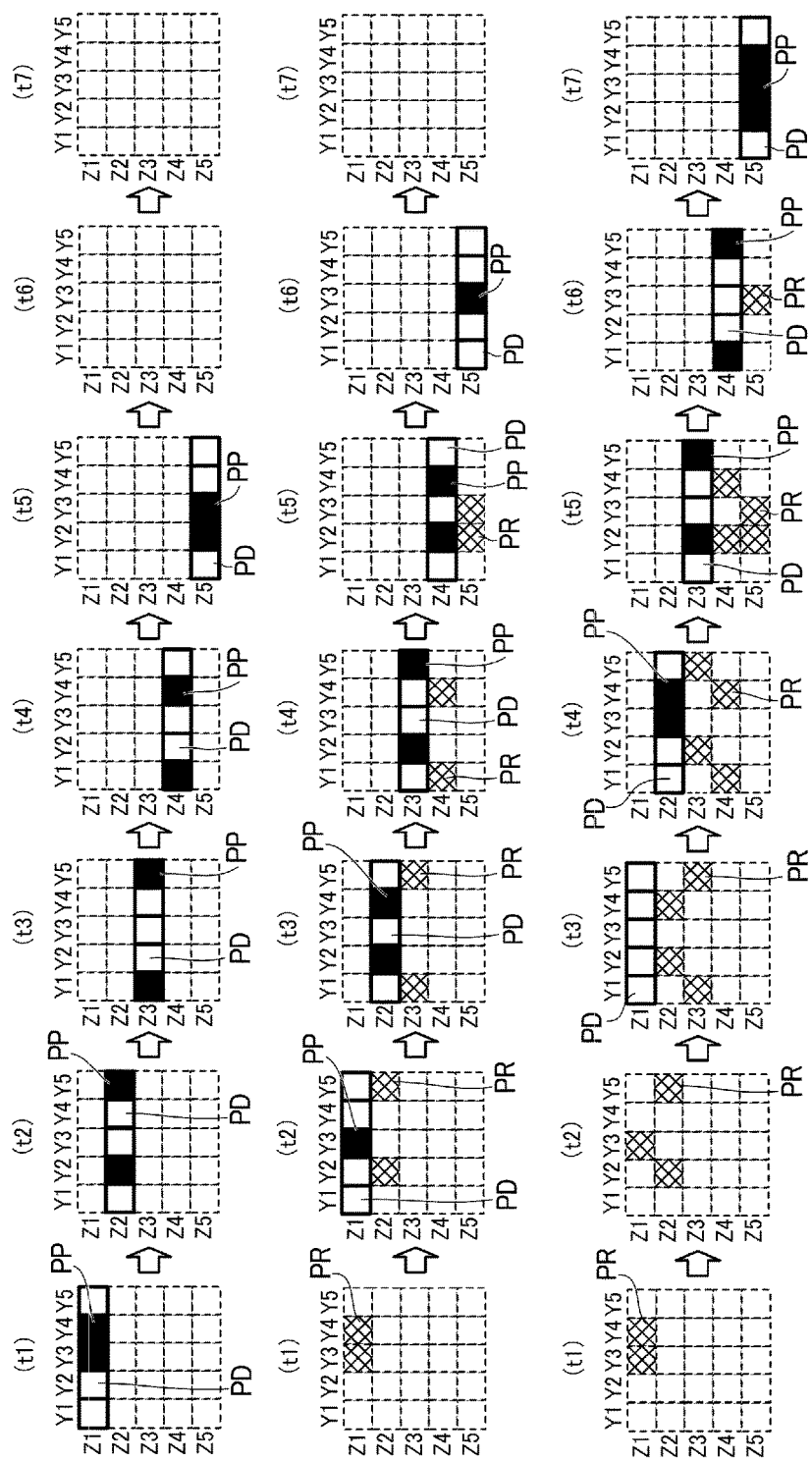
FIGS. 21A to 21C are explanatory diagrams showing transition of a projection state in the fourth embodiment.

FIG. 20 is a flowchart showing the operation of the projection system 1 in a fourth embodiment. FIGS. 21A to 21C are explanatory diagrams showing transition of a projection state in the fourth embodiment.

In the fourth embodiment, since the configuration of the projection system 1 is the same as the configuration explained in the first embodiment, illustration and explanation of the configuration are omitted.

In the operation shown in FIG. 20, step S41 is common to FIG. 12.

The matching processing section 14 sets the number of divisions Vn in the height direction of the ejection space 30A based on a maximum value and a minimum value of Z coordinates of the sectional shape data 18A (step S71). Subsequently, the data generating section 13 generates line segment shape data indicating an image of the sectional shape data 18A (step S72). The line segment shape data is data obtained by extracting a pixel located in a specific Z coordinate in the image of the sectional shape data 18A. A line segment has a size for one pixel in the Z-axis direction and extends in the Y-axis direction. In step S72, the data generating section 13 generates line segment shape data in a plurality of Z coordinates of the image of the sectional shape data 18A. The size for one pixel may be equivalent to one pixel of the panel 221. A plurality of pixels equivalent to a Z coordinate of the panel 221 may be set as one pixel. A size including these pixels may be set as the size for one pixel.

The data generating section 13 specifies X coordinates, Y coordinates, and Z coordinates of the line segment shape data generated in step S72 (step S73).

The matching processing section 14 executes, based on a maximum value and a minimum value of the Y coordinates of the line segment shape data, matching processing for positions of the nozzles 33 in the Y-axis direction and coordinates of pixels in the Y-axis direction of the panel 221 (step S74). In step S74, matching for associating the pixels of the panel 221 and the Y coordinates of the line segment shape data is performed. Consequently, positions of pixels of the line segment shape data are determined in the Y-axis direction of the panel 221. In step S74, matching for associating the positions of the nozzles 33 in the Y-axis direction and the Y coordinates of the line segment shape data is performed. Consequently, it is possible to specify positions in the Y-axis direction of the droplets DP involved in display of the line segment shape data. That is, the nozzles 33 that eject the droplets DP in order to display the line segment shape data are determined.

The matching processing section 14 executes, based on a maximum value and a minimum value of the Z coordinates of the sectional shape data 18A, matching processing of pixels in the Z-axis direction of the panel 221 with coordinates (step S75). The processing in step S75 is the same as the processing in step S43. Consequently, the pixels of the panel 221 and the Z coordinates of the sectional shape data 18A are associated. Pixels for displaying an image of the sectional shape data 18A on the panel 221 are determined in the Z-axis direction.

As in step S44, the matching processing section 14 executes matching processing for the maximum value and the minimum value of the Z coordinates of the sectional shape data 18A and positions in the height H direction of the ejection space 30A (step S76). Consequently, it is possible to specify positions in the Z-axis direction of the droplets DP at the time when the sectional shape data 18A is displayed by the screen forming section 30.

The matching processing section 14 executes, based on the line segment shape data, matching processing for ejection timing of the screen forming device 3 and display timing of the panel 221 (step S77). Consequently, matching is performed according to timing for drawing an image of the line segment shape data on the panel 221 with the positions of the droplets DP in the Z-axis direction.

The matching processing section 14 generates matching processing data indicating a result of the matching in steps S71 to S77 and causes the first storing section 17 to store the matching processing data (step S78).

The control device 10 displays a stereoscopic image based on the three-dimensional shape data. That is, the control device 10 causes the projector 2 to execute projection of an image and causes the screen forming device 3 to execute formation of a screen. The projection control section 15 may control the projector 2 and the screen forming device 3 to execute an operation explained below. The projection control section 15 may transmit data necessary for display processing to the projector 2 and the screen forming device 3. The second control section 201 and the third control section 301 may respectively execute processing.

According to the control by the control device 10, the nozzle row 34 in the Xa position among the nozzle rows 34 of the ejection head 31 lined in the X-axis direction is selected by the head driving section 302. The head driving section 302 ejects the droplets DP once from the nozzles 33 present in a position corresponding to the sectional shape data 18A in the Y-axis direction among the nozzles 33 forming the selected nozzle row 34 (step S79).

Subsequently, at timing when a screen is formed by the droplets DP ejected from the nozzles 33, an image of the line segment shape data of a Z coordinate corresponding to the nozzle row Xa is projected by the projector 2 (step S80). In step S80, the projector 2 sequentially projects images of a plurality of line segment shape data to correspond to Z coordinates of the droplets DP.

The control device 10 determines whether projection of all sectional images forming the three-dimensional shape data 18, that is, images based on all the sectional shape data 18A has ended (step S81). When the projection of all the sectional images has ended (YES in step S81), the control device 10 ends the processing.

When the projection of the sectional images has not ended (NO in step S81), the control device 10 adds 1 to Xa (Xa=Xa+1), switches the nozzle row 34 and the sectional shape data 18A (step S82), and returns to step S47.

By repeatedly executing steps S79 to S82 by the number of the sectional shape data 18A forming the three-dimensional shape data 18, the three-dimensional shape data 18 is projected to the ejection space 30A.

Like FIG. 17, FIGS. 21A to 21C are front views of the ejection space 30A viewed in the X-axis direction and show a Y-Z plane located in an X coordinate of the nozzle row 34. Positions and portions indicated by the signs PD, PP, and PR in FIGS. 21A to 21C are common to FIG. 17.

FIG. 21A shows a display state of the plane image FP1. FIG. 21B shows a display state of the plane image FP2. FIG. 21C shows a display state of the plane image FP3. In FIGS. 21A to 21C, times t1, t2, . . . , and t7 are common. That is, FIGS. 21A to 21C show the display states of the plane images FP1, FP2, and FP3 displayed on Y-Z planes in different X coordinates at the common times t1 to t7.

In an example shown in FIGS. 21A to 21C, the droplets DP are ejected once from all the nozzles 33 included in the nozzle row 34 in the X coordinate corresponding to the plane image FP1.

The projector 2 projects an image of line segment shape data corresponding to a Z coordinate Z1 at the time t1 when the droplets DP reach the height position Z1 corresponding to a projection position of an image. At the time t2, the projector 2 projects an image of line segment shape data corresponding to a Z coordinate Z2. At the time t3, the projector 2 projects an image of line segment shape data corresponding to a Z coordinate Z3. The projector 2 continues the same operation until the time t5 when the droplets DP are located in a Z coordinate Z5 in the bottom stage.

On the other hand, about the plane image FP2, the projector 2 does not perform projection at the time t1. This is because an image of the line segment shape data of the plane image FP1 is projected in the position Z1. At the time t2, the projector 2 projects the image light PL of the line segment shape data corresponding to the Z1 position of the plane image FP2. The projector 2 continues the projection of the image of the line segment shape data until the time t6 according to the position of the droplets DP corresponding to the plane image FP2.

Further, about the plane image FP3, the projector 2 does not perform projection at the times t1 and t2. This is because an image of the line segment shape data of the plane image FP1 is projected in the position Z1 at the time t1 and an image of the line segment shape data of the plane image FP2 is projected in the position Z1 at the time t2. At the time t3, the projector 2 projects the image light PL of the line segment shape data corresponding to the Z1 position of the plane image FP3. The projector 2 continues the projection of the image of the line segment shape data until the time t7 according to the position of the droplets DP corresponding to the plane image FP3.

In this way, in the example shown in FIGS. 21A to 21C, the droplets DP to be screens onto which the plane images FP1, FP2, and FP3 are projected are ejected from the nozzles 33 at shifted timings. The projector 2 projects the images based on the line segment shape data of the plane images FP1 FP2, and FP3 according to the respective ejection timings of the droplets DP and the Z coordinates of the droplets DP.

According to the fourth embodiment, the same action and effects as the action effects in the first, second, and third embodiments are obtained.

Further, in the fourth embodiment, the data generating section 13 of the control device 10 generates line segment shape data by dividing the sectional shape data 18A in the Z-axis direction. The matching processing section 14 correlates coordinates of the line segment shape data, coordinates of the pixels on the panel 221 of the projector 2, the nozzles 33 of the screen forming device 3, and heights of the ejection space 30A from the nozzles 33 in the Z-axis direction.

Consequently, by projecting the line segment shape data obtained by dividing the sectional shape data 18A in the Z-axis direction according to the position in the Z-axis direction of the droplets DP, it is possible to project an image of the sectional shape data 18A onto a screen. By using the line segment shape data, it is possible to project images relating to a plurality of sectional shape data 18A while shifting the images in the Z-axis direction. Therefore, since it is possible to project the images relating to the plurality of sectional shape data 18A in parallel not to overlap, it is possible to project the entire three-dimensional shape data 18 in a short time. Accordingly, it is possible to project the stereoscopic image TP richer in cubic effect.

Further, the screen forming device 3 drives the nozzles 33 in a unit of the nozzle row 34 including the plurality of nozzles 33 lined in the X-axis direction or the Y-axis direction. The screen forming device 3 forms one screen with the droplets DP ejected from one nozzle row 34. The screen forming device 3 ejects the liquid with a time difference from the plurality of nozzle rows 34 equivalent to the plurality of sectional shape data 18A to thereby start formation of another screen before one screen is formed.

Consequently, it is possible to form a plurality of screens in parallel. The projector 2 can project images based on the plurality of sectional shape data 18A in parallel.

Furthermore, the screen forming device 3 forms a linear screen having a unit height in the Z-axis direction with the droplets DP ejected from the nozzle row 34. Accordingly, by projecting images based on the line segment shape data divided in the Z-axis direction, the projector 2 can project images based on the plurality of sectional shape data 18A in parallel.

The projector 2 projects a linear image according to the height in the Z-axis direction of the linear screen. Consequently, since it is possible to project the images relating to the plurality of sectional shape data 18A in parallel not to overlap, it is possible to project the entire three-dimensional shape data 18 in a short time. Accordingly, it is possible to project the stereoscopic image TP richer in cubic effect.

5. Fifth Embodiment

Figure 22:
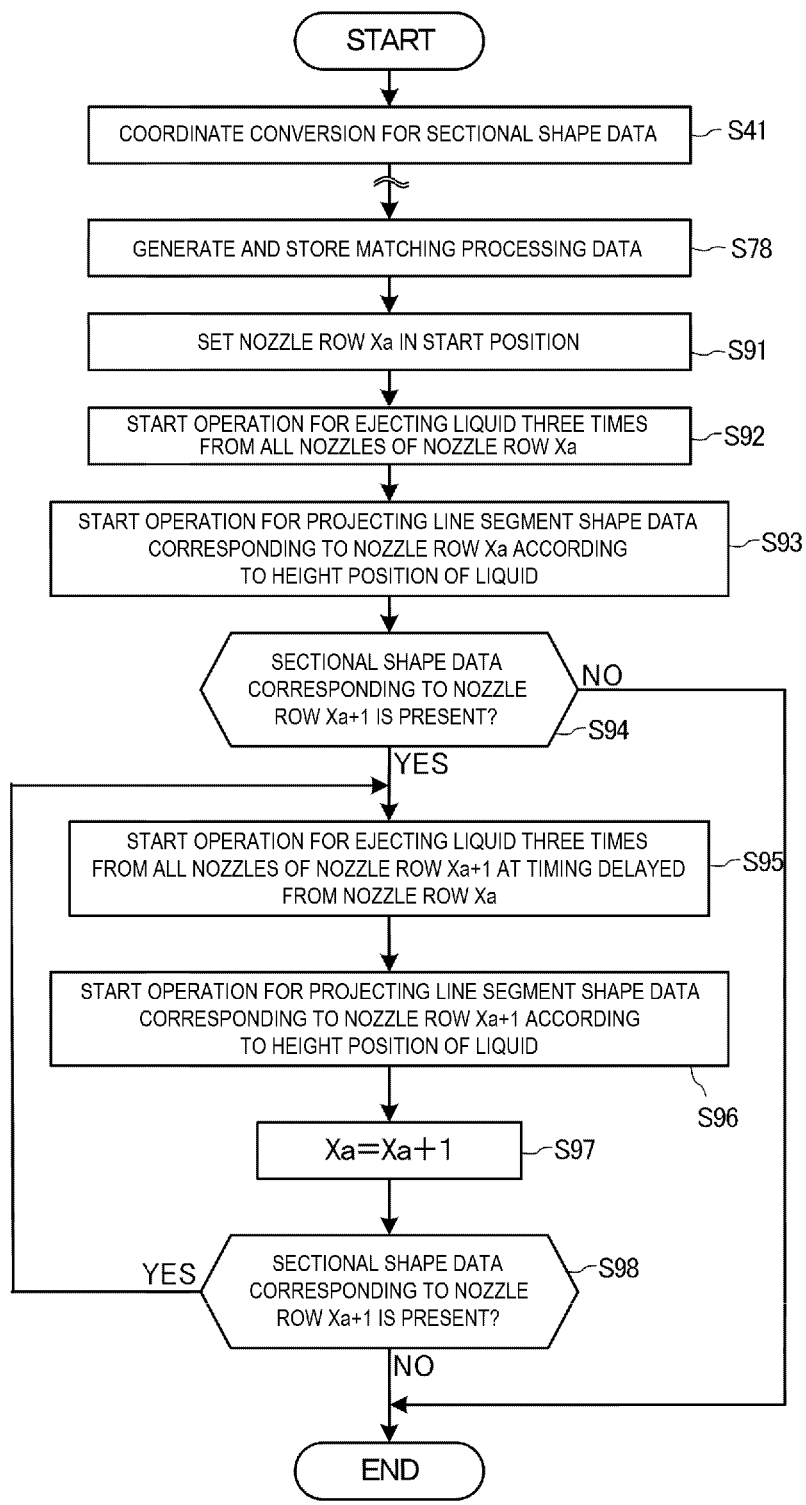
FIG. 22 is a flowchart showing the operation of a projection system in a fifth embodiment.
Figures 23A, 23B, 23C:
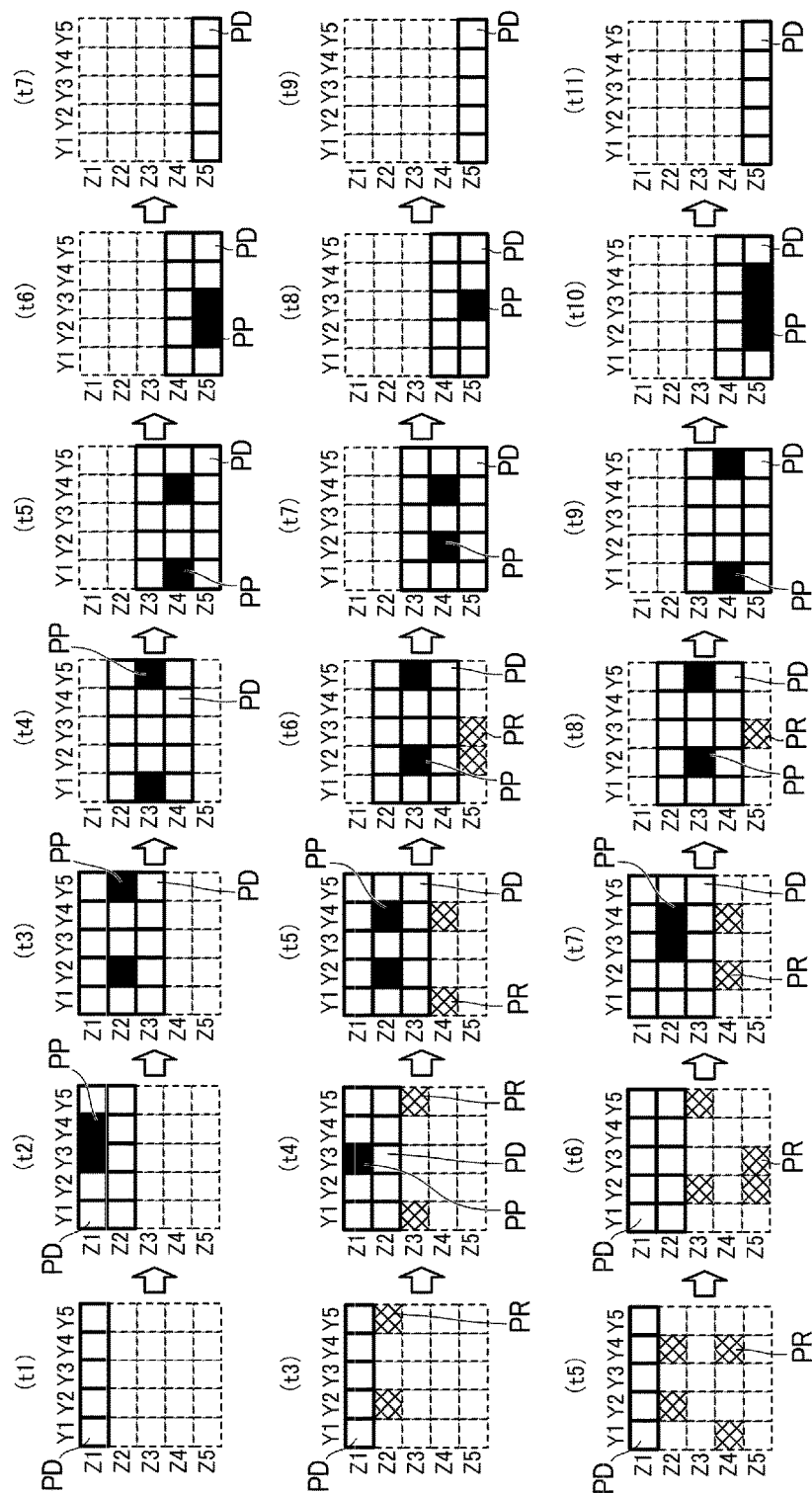
FIGS. 23A to 23C are explanatory diagrams showing transition of a projection state in the fifth embodiment.

FIG. 22 is a flowchart showing the operation of the projection system 1 in a fifth embodiment. FIGS. 23A to 23C are explanatory diagrams showing transition of a projection state in the fifth embodiment.

In the fifth embodiment, since the configuration of the projection system 1 is the same as the configuration explained in the first to fourth embodiments, illustration and explanation of the configuration are omitted.

In the operation shown in FIG. 22, steps S41 and S71 to S78 are common to FIG. 20.

Following step S78, the control device 10 displays a stereoscopic image based on the three-dimensional shape data. That is, the control device 10 causes the projector 2 to execute projection of an image and causes the screen forming device 3 to execute formation of a screen. The projection control section 15 may control the projector 2 and the screen forming device 3 to execute an operation explained below. The projection control section 15 may transmit data necessary for display processing to the projector 2 and the screen forming device 3. The second control section 201 and the third control section 301 may respectively execute processing.

According to the control by the control device 10, the nozzle row 34 in the Xa position, which is a start position, among the nozzle rows 34 of the ejection head 31 lined in the X-axis direction is set by the head driving section 302 (step S91).

The head driving section 302 starts an operation for continuously ejecting the droplets DP three times from the nozzles 33 forming the set nozzle row 34 in the set start position (step S92). An ejection interval of the droplets DP is set in advance to correspond to a time in which the droplets DP fall between Z1 and Z2.

On the other hand, in parallel to step S92, the projector 2 projects an image of line segment shape data in a Z coordinate corresponding to a nozzle row Xa at timing when a screen is formed by the droplets DP ejected from the nozzles 33 (step S93). In step S93, the projector 2 simultaneously projects an image of one line segment shape data corresponding to a Z coordinate of the droplets DP. The droplets DP ejected by the nozzles 33 in the operation from step S92 are lined in three rows at most in the Z-axis direction. The projector 2 projects the image of the one line segment shape data to the droplets DP in one row located in the center in the Z-axis direction with respect to a plurality of rows of the droplets DP lined in the Z-axis direction.

The control device 10 determines whether the sectional shape data 18A corresponding to the next nozzle row 34 in the Xa position set in step S91, that is, the nozzle row 34 in an Xa+1 position is present (step S94). When the corresponding sectional shape data 18A is absent (NO in step S94), the control device 10 ends the processing.

When the sectional shape data 18A corresponding to the nozzle row 34 in the Xa+1 position is present (YES in step S94), the screen forming device 3 starts an operation for ejecting the droplets DP from the nozzle row 34 in the Xa+1 position (step S95). In step S95, at timing delayed from the ejection in the Xa position from which the ejection is started in step S92, the screen forming device 3 starts an operation for continuously ejecting the droplets DP three times from the nozzle row 34 in the Xa+1 position. The projector 2 projects an image of line segment shape data in a Z coordinate corresponding to the nozzle row Xa+1 at timing when a screen is formed by the droplets DP ejected from the nozzles 33 (step S95). In step S95, as in step S93, the projector 2 projects an image of one line segment shape data with respect to the droplets DP in a plurality of rows lined in the Z-axis direction.

The control device 10 adds 1 to a value of Xa indicating the position of the nozzle row 34 (step S97) and determines, based on the increased Xa, whether the sectional shape data 18A corresponding to the nozzle row 34 in the Xa+1 position is present (step S98). When the corresponding sectional shape data 18A is absent (NO in step S98), the control device 10 ends the processing. When the sectional shape data 18A corresponding to the nozzle row 34 in the Xa+1 position is present (YES in step S98), the control device 10 shifts to step S95.

Like FIGS. 21A to 21C, FIGS. 23A to 23C are front views of the ejection space 30A viewed in the X-axis direction and show a Y-Z plane located in an X coordinate of the nozzle row 34. Positions and portions indicated by the signs PD, PP, and PR in FIGS. 23A to 23C are common to FIG. 17.

FIG. 23A shows a display state of the plane image FP1. FIG. 23B shows a display state of the plane image FP2. FIG. 23C shows a display state of the plane image FP3. Times t1, t2, . . . , and t11 in FIGS. 23A, 23B, and 23C are common. That is, FIGS. 23A, 23B, and 23C show display states of the plane images FP1, FP2, and FP3 displayed on Y-Z planes in different X coordinates in a common period at times t1 to t11.

In an example shown in FIGS. 23A to 23C, the droplets DP are continuously ejected three times from all the nozzles 33 included in the nozzle row 34 in an X coordinate corresponding to the plane image FP1. The projector 2 projects an image of line segment shape data corresponding to a Z coordinate of the droplets DP. The projector 2 projects the image based on the line segment shape data to the droplets DP in one row located in the center in the Z-axis direction among the droplets DP in three rows lined in the Z-axis direction. That is, at the time t2, the projector 2 projects an image of line segment shape data corresponding to the Z coordinate Z1. At the time t3, the projector 2 projects an image of line segment shape data corresponding to the Z coordinate Z2. The projector 2 continues the same operation until the time t6 when the droplets DP in the center are located in the Z coordinate Z5 in the bottom stage.

As shown in FIG. 23B, at the time t3, the screen forming device 3 starts ejection of the droplets DP from the nozzle row 34 in an X coordinate of a screen corresponding to the plane image FP2.

The projector 2 projects the image light PL to the droplets DP in the position Z1 at timing when the droplets DP ejected from the nozzle row 34 reaches the position Z2. Thereafter, until time t8, the projector 2 projects an image to the droplets DP in an X coordinate corresponding to the plane image FP2.

Further, as shown in FIG. 23C, at the time t5, the screen forming device 3 starts ejection of the droplets DP from the nozzle row 34 in an X coordinate of a screen corresponding to the plane image FP3. The projector 2 projects the image light PL to the droplets DP in the center in the Z-axis direction among the droplets DP in the three rows ejected from the nozzle row 34. Thereafter, until the time t10, the projector 2 projects an image to the droplets DP in an X coordinate corresponding to the plane image FP3.

As explained above, with a projection method shown in FIGS. 23A to 23C, the droplets DP to be the screens onto which the plane images FP1, FP2, and FP3 are projected are ejected from the nozzles 33 at shifted timings. The projector 2 projects the plane image FP1, the plane image FP2, and the plane image FP3 in shifted positions in the Z-axis direction. Consequently, the plane images FP1, FP2, and FP3 can be respectively projected to appropriate X coordinates.

According to the fifth embodiment, the same action and effects as the action effects in the first to fourth embodiments are obtained.

Further, the projector 2 projects an image smaller than a size in the Y-axis direction of a screen in a first height position according to a first height position in the Z-axis direction of the screen. For example, at the time t2, the projector 2 projects an image smaller than sizes Y1 to Y5 in the Y-axis direction of the droplets DP in the position Z1. Therefore, it is possible to project an image based on the sectional shape data 18A not to protrude from the droplets DP. Consequently, it is possible to clearly project the stereoscopic image TP onto a screen formed by the droplets DP.

6. Sixth Embodiment

Figure 24:
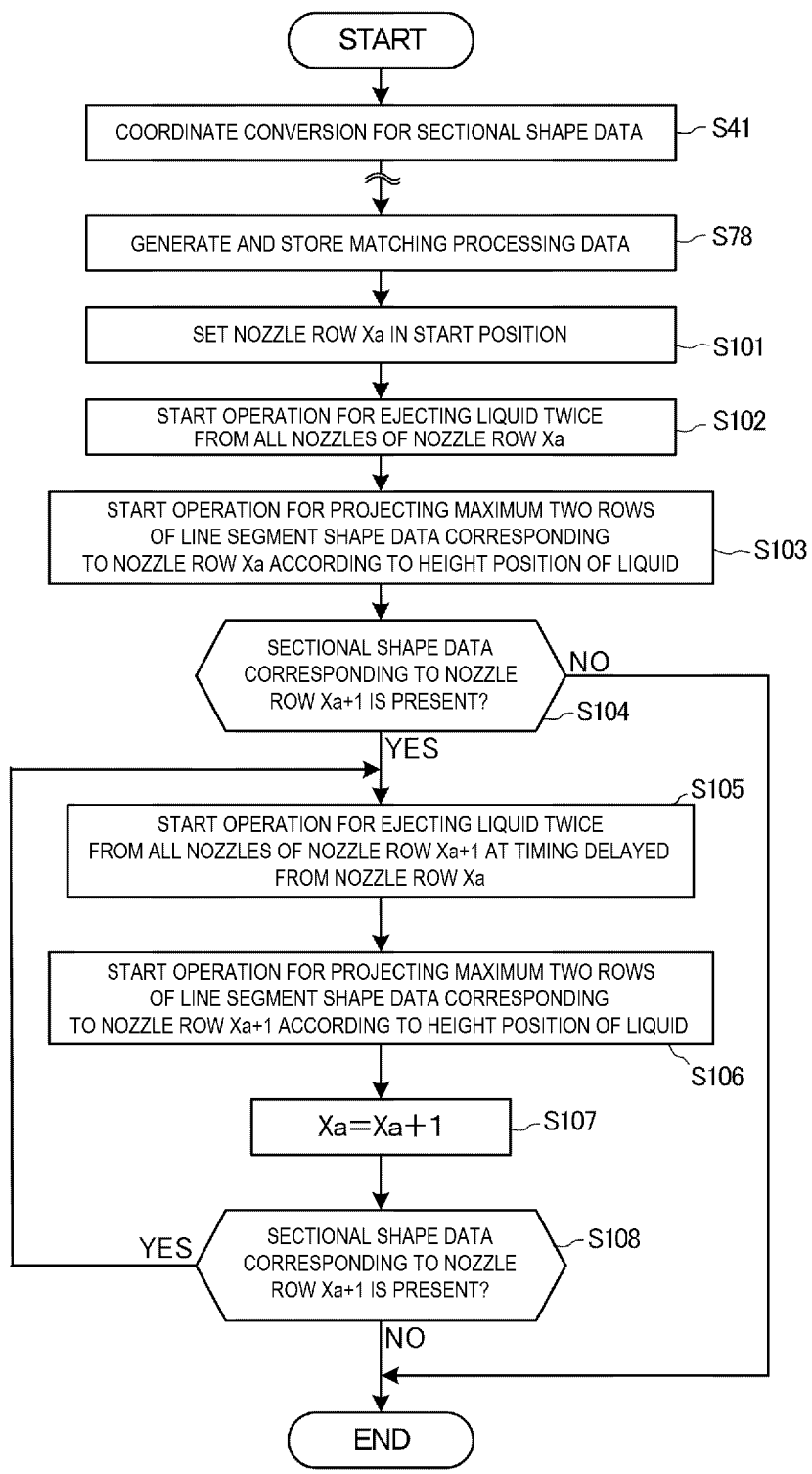
FIG. 24 is a flowchart showing the operation of a projection system in a sixth embodiment.
Figures 25A, 25B, 25C:
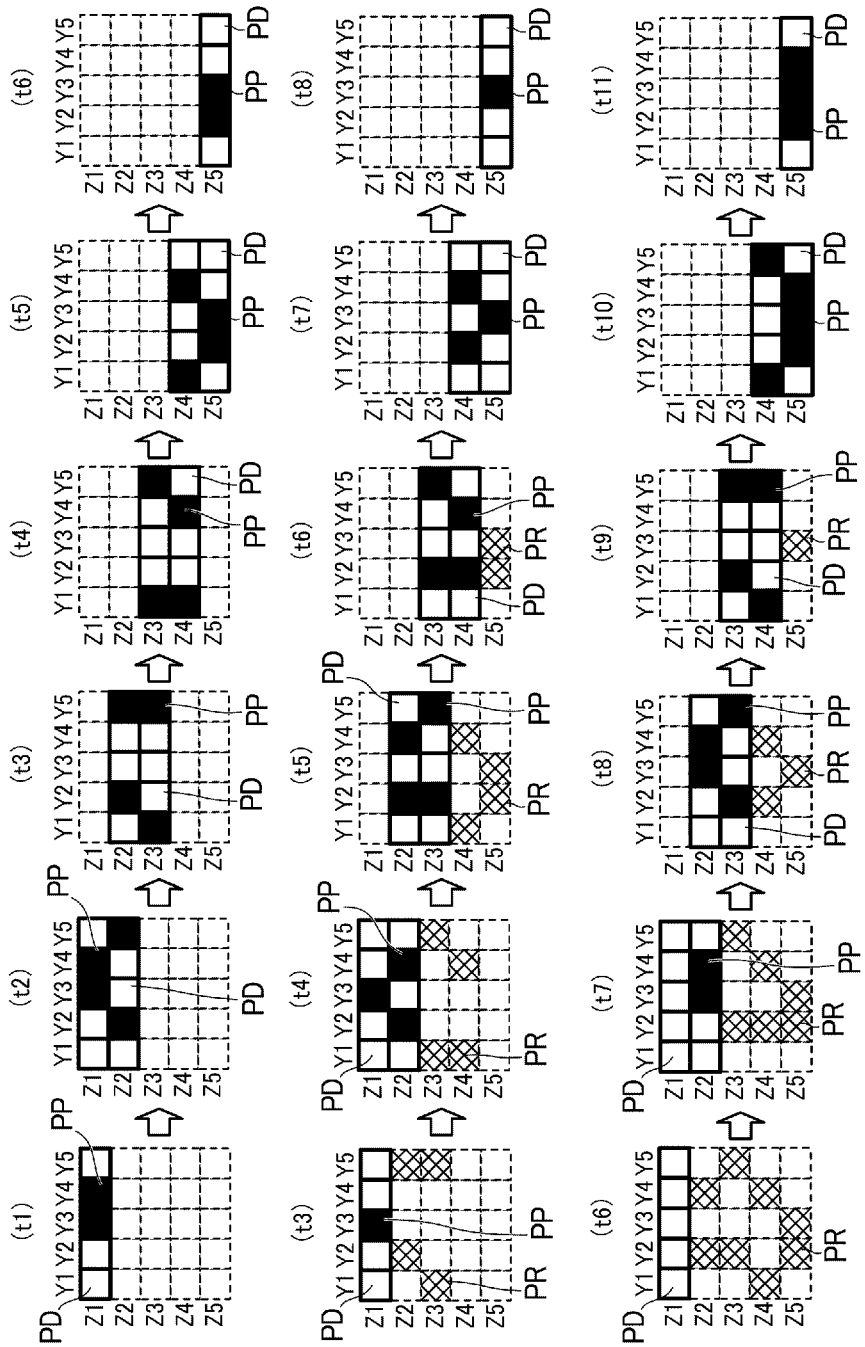
FIGS. 25A to 25C are explanatory diagrams showing transition of a projection state in the sixth embodiment.

FIG. 24 is a flowchart showing the operation of the projection system 1 in a sixth embodiment. FIGS. 25A to 25C are explanatory diagrams showing transition of a projection state in the sixth embodiment.

In the sixth embodiment, since the configuration of the projection system 1 is the same as the configuration explained in the first to fifth embodiments, illustration and explanation of the configuration are omitted.

In the operation shown in FIG. 24, steps S41 and S71 to S78 are common to FIG. 20.

Following step S78, the control device 10 displays a stereoscopic image based on the three-dimensional shape data. That is, the control device 10 causes the projector 2 to execute projection of an image and causes the screen forming device 3 to execute formation of a screen. The projection control section 15 may control the projector 2 and the screen forming device 3 to execute an operation explained below. The projection control section 15 may transmit data necessary for display processing to the projector 2 and the screen forming device 3. The second control section 201 and the third control section 301 may respectively execute processing.

According to the control by the control device 10, the nozzle row 34 in the Xa position, which is a start position, among the nozzle rows 34 of the ejection head 31 disposed side by side in the X-axis direction is set by the head driving section 302 (step S101).

The head driving section 302 starts an operation for continuously ejecting the droplets DP twice from the nozzles 33 forming the set nozzle row 34 in the start position (step S102). An ejection interval of the droplets DP is set in advance to correspond to a time in which the droplets DP fall between Z1 and Z2.

On the other hand, in parallel to step S102, the projector 2 projects an image of line segment shape data in a Z coordinate corresponding to a nozzle row Xa at timing when a screen is formed by the droplets DP ejected from the nozzles 33 (step S103). In step S103, the projector 2 simultaneously projects images of two line segment shape data corresponding to a Z coordinate of the droplets DP. The droplets DP ejected by the nozzles 33 in the operation from step S102 are present in one or two rows in the Z-axis direction. The projector 2 projects the image of the one or two line segment shape data to the droplets DP lined in the Z-axis direction.

The control device 10 determines whether the sectional shape data 18A corresponding to the next nozzle row 34 in the Xa position set in step S101, that is, the nozzle row 34 in an Xa+1 position is present (step S104). When the corresponding sectional shape data 18A is absent (NO in step S104), the control device 10 ends the processing.

When the sectional shape data 18A corresponding to the nozzle row 34 in the Xa+1 position is present (YES in step S104), the screen forming device 3 starts an operation for ejecting the droplets DP from the nozzle row 34 in the Xa+1 position (step S105). In step S105, at timing delayed from the nozzle row 34 in the Xa position from which the ejection is started in step S102, the screen forming device 3 starts an operation for continuously ejecting the droplets DP three times from the nozzle row 34 in the Xa+1 position. The projector 2 projects an image of line segment shape data in a Z coordinate corresponding to the nozzle row Xa+1 at timing when a screen is formed by the droplets DP ejected from the nozzles 33 (step S105). In step S105, as in step S103, the projector 2 projects an image of one or two line segment shape data with respect to the droplets DP in one or two rows lined in the Z-axis direction.

The control device 10 adds 1 to a value of Xa indicating the position of the nozzle row 34 (step S107) and determines, based on the increased Xa, whether the sectional shape data 18A corresponding to the nozzle row 34 in the Xa+1 position is present (step S108). When the corresponding sectional shape data 18A is absent (NO in step S108), the control device 10 ends the processing. When the sectional shape data 18A corresponding to the nozzle row 34 in the Xa+1 position is present (YES in step S108), the control device 10 shifts to step S105.

Like FIGS. 21A to 21C and FIGS. 23A to 23C, FIGS. 25A to 25C are front views of the ejection space 30A viewed in the X-axis direction and show a Y-Z plane located in an X coordinate of the nozzle row 34. Positions and portions indicated by the signs PD, PP, and PR in FIGS. 25A to 25C are common to FIG. 17.

FIG. 25A shows a display state of the plane image FP1. FIG. 25B shows a display state of the plane image FP2. FIG. 25C shows a display state of the plane image FP3. Times t1, t2, . . . , and t11 in FIGS. 25A, 25B, and 25C are common. That is, FIGS. 25A, 25B, and 25C show display states of the plane images FP1, FP2, and FP3 displayed on Y-Z planes in different X coordinates in a common period at the times t1 to t11.

In an example shown in FIGS. 25A to 25C, the droplets DP are continuously ejected twice from all the nozzles 33 included in the nozzle row 34 in an X coordinate corresponding to the plane image FP1. The projector 2 projects an image of line segment shape data corresponding to a Z coordinate of the droplets DP. The projector 2 projects the image based on the line segment shape data to the droplets DP in one or two rows lined in the Z-axis direction. That is, at the time t1, the projector 2 projects an image of line segment shape data corresponding to the Z coordinate Z1. At the time t2, the projector 2 projects images of two line segment shape data corresponding to the Z coordinates Z1 and Z2. The projector 2 continues the same operation until the time t6 when the droplets DP in the center are located in the Z coordinate Z5 in the bottom stage.

As shown in FIG. 25B, at the time t3, the screen forming device 3 starts ejection of the droplets DP from the nozzle row 34 in an X coordinate of a screen corresponding to the plane image FP2.

The projector 2 projects the image light PL to the droplets DP in the position Z1 with respect to the droplets DP ejected from the nozzle row 34. Until the time t8, the projector 2 projects an image to the droplets DP in an X coordinate corresponding to the plane image FP2.

Further, as shown in FIG. 25C, at the time t6, the screen forming device 3 starts ejection of the droplets DP from the nozzle row 34 in an X coordinate of a screen corresponding to the plane image FP3. The projector 2 projects the image light PL to the droplets DP in two rows ejected from the nozzle row 34. Thereafter, until the time t11, the projector 2 projects an image to the droplets DP in an X coordinate corresponding to the plane image FP3.

According to the sixth embodiment, the same action and effects as the action effects in the first to fifth embodiments are obtained.

Further, according to the sixth embodiment, the droplets DP to be the screens onto which the plane images FP1, FP2, and FP3 are projected are ejected for two rows at most from the nozzles 33 at shifted timings. The projector 2 projects the plane image FP1, the plane image FP2, and the plane image FP3 in shifted positions in the Z-axis direction. Accordingly, the plane images FP1, FP2, and FP3 can be respectively projected to appropriate X coordinates. Since the projector 2 projects an image based on line segment shape data in two rows at most, it is possible to increase an information amount of an afterimage visually recognized by a user. It is possible to project the stereoscopic image TP richer in cubic effect.

7. Seventh Embodiment

A seventh embodiment applied with the present disclosure is explained.

In the projection system 1 according to the seventh embodiment, the screen forming device 3 is capable of adjusting a size of the droplets DP ejected from the nozzles 33. That is, the screen forming device 3 can set, at least in a plurality of stages, a liquid amount per one drop of the droplets DP ejected from the nozzles 33. This configuration can be realized by enabling a mechanism for pressing out liquid from the nozzles 33 to be controlled by the third control section 301. Except this configuration, the configuration of the projection system 1 in the seventh embodiment is the same as the configuration explained in the first to third embodiments. Therefore, illustration and explanation are omitted about common portions.

Figure 26:
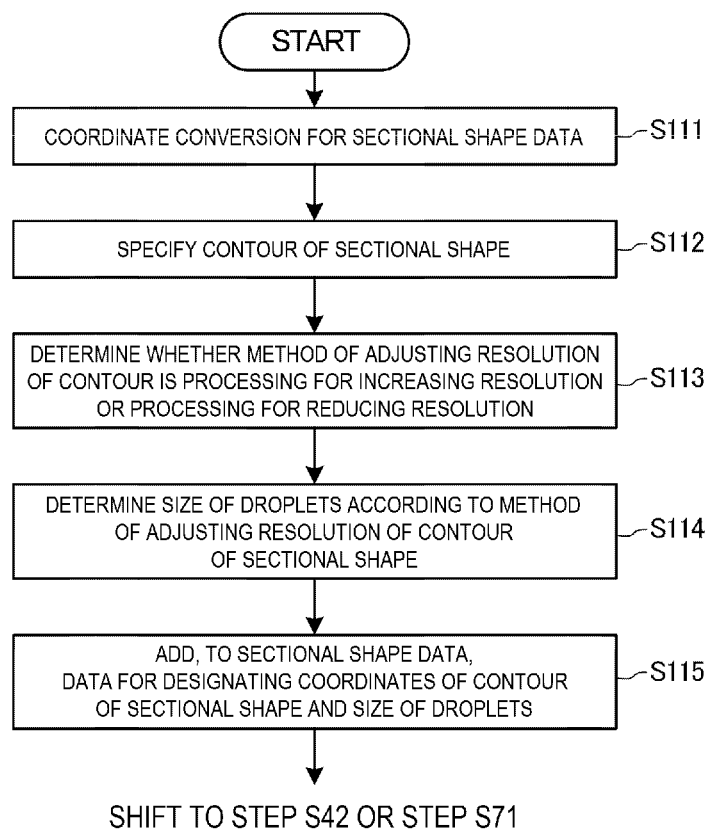
FIG. 26 is a flowchart showing the operation of a projection system in a seventh embodiment.

FIG. 26 is a flowchart showing the operation of the projection system 1 in the seventh embodiment.

The projection system 1 executes processing for highlighting a contour about the sectional shape data 18A generated from the three-dimensional shape data 18.

The operation shown in FIG. 26 is executed instead of the coordinate conversion processing executed by the data generating section 13 in step S41 explained in the first to sixth embodiments.

The data generating section 13 performs coordinate conversion for the sectional shape data 18A and converts the sectional shape data 18A into data of a plane image having a Y coordinate and a Z coordinate (step S111). Consequently, the sectional shape data 18A is converted into data of a plane image on a Y-Z plane, for example, as shown in FIG. 10.

The data generating section 13 specifies a coordinate of a contour of the plane image on the Y-Z plane (step S112).

The data generating section 13 determines processing for increasing the resolution or processing for reducing the resolution as a method of adjusting the resolution of a contour of the sectional shape data 18A (step S113). In step S113, preset processing of the processing for increasing the resolution and the processing for reducing the resolution or processing corresponding to operation by a user is selected.

The data generating section 13 determines, according to the determination in step S113, a size of the droplets DP corresponding to coordinates of the contour of the sectional shape data 18A (step S114). The data generating section 13 adds data for designating the coordinates of the contour of the sectional shape data 18A and the size of the droplets DP corresponding to the contour to the sectional shape data 18A for which the coordinate conversion is performed in step S111 (step S115). Thereafter, the control device 10 shifts to the processing in step S42 or step S71.

When executing the operations in the first to sixth embodiments using this data, the screen forming device 3 ejects, from the nozzles 33, the droplets DP having the size designated by the data added to the sectional shape data 18A. Consequently, in a position corresponding to the contour of the sectional shape data 18A, a size of the droplets DP is different from a size of the droplets DP ejected from the other nozzles 33. Therefore, even if the image light PL projected by the projector 2 does not change, it is possible to highlight a contour of the plane image FP and cause the user to visually recognize the contour.

According to the seventh embodiment, the same action effects as the action effects in the first to sixth embodiments are obtained.

Further, according to the seventh embodiment, the control device 10 extracts a contour of an image based on the sectional shape data 18A from coordinates of the sectional shape data 18A. The screen forming device 3 forms a screen with the droplets DP by ejecting the droplets DP in a drop shape from the nozzles 33. The screen forming device 3 differentiates a size of the droplets DP ejected from the nozzles 33 corresponding to the contour of the image of the sectional shape data 18A from a size of the droplets DP ejected from the other nozzles 33.

Therefore, it is possible to highlight the contour of the plane image FP and cause the user to visually recognize the contour. It is possible to project the stereoscopic image TP richer in cubic effect.

8. Eighth Embodiment

Figure 27:
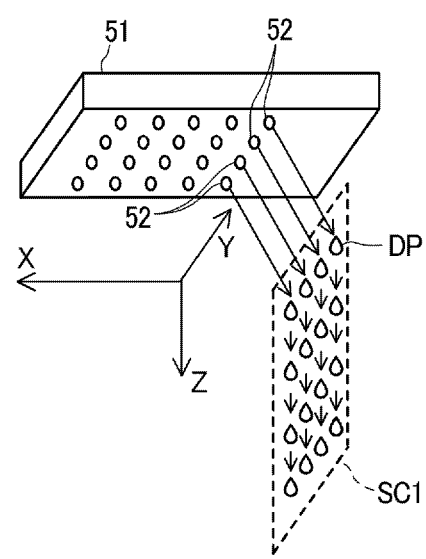
FIG. 27 is a perspective view showing a configuration example of an ejection head in an eighth embodiment.

FIG. 27 is a perspective view showing a configuration example of an ejection head 51 in an eighth embodiment.

The ejection head 51 explained in the eighth embodiment is provided in the screen forming device 3 instead of the ejection head 31. The ejection head 51 includes a plurality of nozzles 52. Like the nozzles 33, the nozzles 52 eject liquid with a not-shown liquid ejecting mechanism and form the droplets DP. In the ejection head 51, the plurality of nozzles 52 are disposed side by side in the X-axis direction and the Y-axis direction. Except this configuration, the configuration of the projection system 1 in the eighth embodiment is the same as the configuration explained in the first to sixth embodiments. Therefore, illustration and explanation are omitted about common portions.

The nozzles 52 are configured to eject the droplets DP in an oblique direction. That is, as shown in FIG. 27, the droplets DP ejected by the ejection head 51 form a screen SC1 in a position deviating from the nozzles 52 in the X-axis direction.

The ejection head 51 shown in FIG. 27 is appliable in each of the first to seventh embodiments and achieves the same action as the action of the nozzles 33. Further, the screen forming device 3 applied with the ejection head 51 can form the screen SC1 with the droplets DP in a position apart from the nozzles 52. Accordingly, for example, it is possible to form the screen SC1 in a position matched to an end portion of the ejection head 51 and project the plane image FP. That is, it is possible to improve flexibility of a position where the plane image FP is projected.

9. Ninth Embodiment

Figure 28:
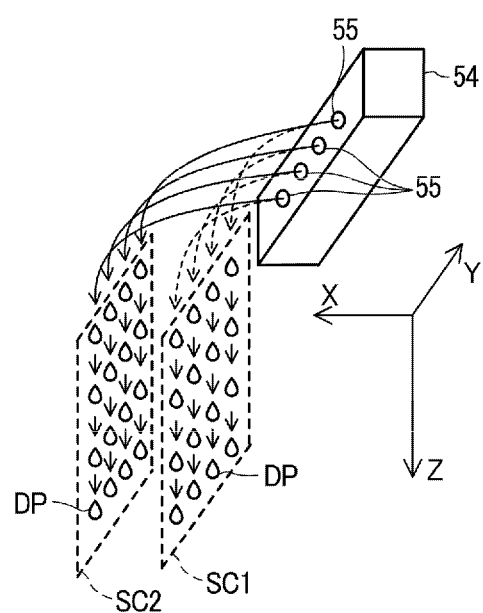
FIG. 28 is a perspective view showing a configuration example of an ejection head in a ninth embodiment.

FIG. 28 is a perspective view showing a configuration example of an ejection head 54 in a ninth embodiment.

The ejection head 54 explained in the ninth embodiment is provided in the screen forming device 3 instead of the ejection head 31. The ejection head 54 includes a plurality of nozzles 55. Like the nozzles 33, the nozzles 55 eject liquid with a not-shown liquid ejecting mechanism and form the droplets DP. Except this configuration, the configuration of the projection system 1 in the ninth embodiment is the same as the configuration explained in the first to sixth embodiments. Therefore, illustration and explanation are omitted about common portions.

The ejection head 54 includes the nozzles 55 in one row lined in the Y-axis direction. The nozzles 55 eject the droplets DP in parallel to the X-axis direction or at an angle close to the X-axis direction. Accordingly, as shown in FIG. 28, the droplets DP ejected by the ejection head 54 fly while drawing a parabola and form screens SC21 and SC22 in positions deviating from the nozzles 52 in the X-axis direction.

When the ejection head 54 is capable of switching, in a plurality of stages, an ejection pressure in ejecting the droplets DP, a flying distance of the droplets DP changes according to the ejection pressure. Therefore, the ejection head 54 forms the screens SC21 and SC22 in different positions in the X-axis direction according to the ejection pressure.

The ejection head 54 shown in FIG. 28 is applicable in each of the first to seventh embodiments. Further, the screen forming device 3 applied with the ejection head 54 can form the screens SC21 and SC22 in different positions in the X-axis direction with the nozzles 55 in one row. Accordingly, even when a space for setting the ejection head 54 is limited, it is possible to form a plurality of screens SC21 and SC22 with liquid and project the stereoscopic image TP.

10. Tenth Embodiment

Figure 29:
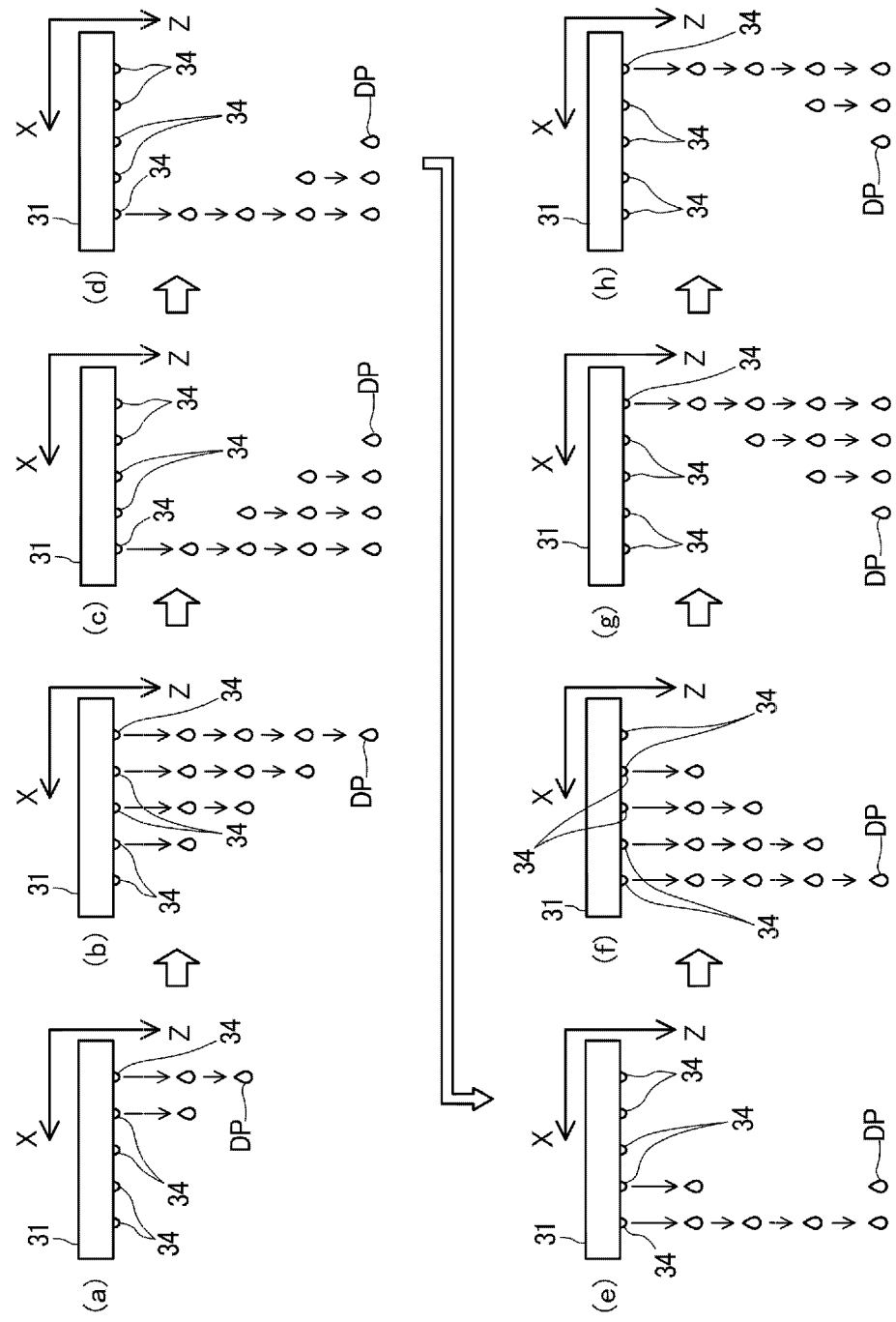
FIG. 29 is an explanatory diagram showing an operation example of a projection system in a tenth embodiment.

FIG. 29 is an explanatory diagram of the operation of the projection system 1 in a tenth embodiment.

The configuration of the projection system 1 in the tenth embodiment is the same as the configuration explained in the first to sixth embodiments. Therefore, illustration and explanation are omitted about common portions.

In FIG. 29, changes in operation states of the ejection head 31 ejecting the droplets DP are indicated by signs (a) to (h) in a time series. First, as shown in states (a) to (c), the screen forming device 3 sequentially selects the nozzle rows 34 in a positive direction of the X axis from a side close to the origin of the X coordinate and ejects the droplets DP. After ejecting the droplets DP from the nozzle row 34 corresponding to the largest X coordinate in a state (d), as shown in a state (e), the screen forming device 3 ejects the droplets DP from the nozzle row 34 adjacent to the nozzle row 34 corresponding to the largest X coordinate. Thereafter, as shown in states (f) to (h), the screen forming device 3 selects the nozzle rows 34 in order in a negative direction toward the origin of the X coordinate and ejects the droplets DP.

In this way, order of selecting the plurality of nozzle rows 34 included in the ejection head 31 is not limited. The nozzle rows 34 may be selected from a small X coordinate side to a large X coordinate side or may be selected back and forth in the X-axis direction. The screen forming device 3 may select every other nozzle rows 34 in the X-axis direction and eject the droplets DP. In all of these cases, the effects in the first to eighth embodiments explained above can be obtained.

11. Eleventh Embodiment

Figure 30:
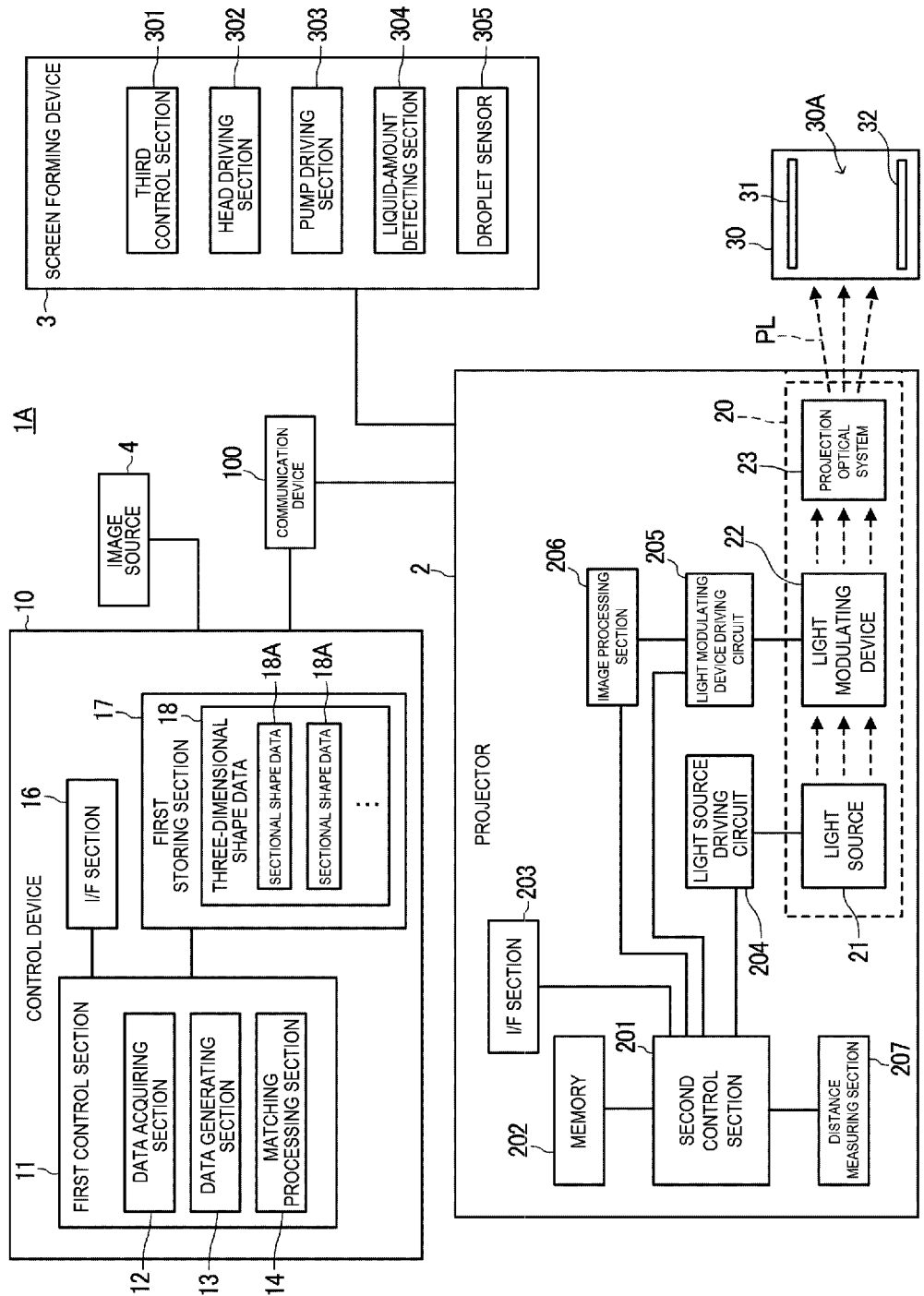
FIG. 30 is a block diagram of a projection system in an eleventh embodiment.

FIG. 30 is a block diagram of a projection system 1A in an eleventh embodiment.

In a configuration shown in FIG. 30, components common to the projection system 1 are denoted by the same reference numerals and signs and explanation of the components is omitted.

The projection system 1A includes the control device 10, the projector 2, and the screen forming device 3. The control device 10 and the projector 2 are coupled via a communication device 100. The projector 2 is coupled to the screen forming device 3. The screen forming device 3 is not directly coupled to the control device 10.

The control device 10 executes the functions of the data acquiring section 12, the data generating section 13, and the matching processing section 14. The control device 10 transmits the three-dimensional shape data 18, the sectional shape data 18A, and matching processing data to the projector 2 with the communication device 100.

In the eleventh embodiment, the projector 2 includes a configuration for enabling the function of the projection control section 15 to be executed by the second control section 201. The projector 2 controls projection of an image by the projecting section 20 and controls formation of a screen by the screen forming device 3, that is, ejection of the droplets DP by the screen forming section 30.

With the configuration in the eleventh embodiment, the control device 10 can execute, for example, the processing relating to the generation of the sectional shape data 18A and the coordinate conversion for the sectional shape data 18A. The projector 2 can execute the processing after the processing executed by the control device 10. For example, the control device 10 executes the processing in steps S41 to S46, S71 to S78, and S111 to S115 and transmits a processing result through the communication device 100. In this case, the projector 2 executes control of steps S47 to S50, S55 to S56, S61 to S62, S79 to S82, S91 to S98, and S101 to S108. Consequently, it is possible to reduce a space required to set the projector 2 that projects an image and the screen forming device 3. The processing executed by the control device 10 can be executed in advance at timing before projection of the stereoscopic image TP. Accordingly, it is possible to relax a temporal restriction required for the projection of the stereoscopic image TP.

In the projection system 1A, a portable semiconductor storage device may be used instead of the communication device 100. In this case, data necessary for the projection of the stereoscopic image TP can be prepared without coupling the control device 10 and the communication device 100 to the projector 2.

12. Twelfth Embodiment

Figure 31:
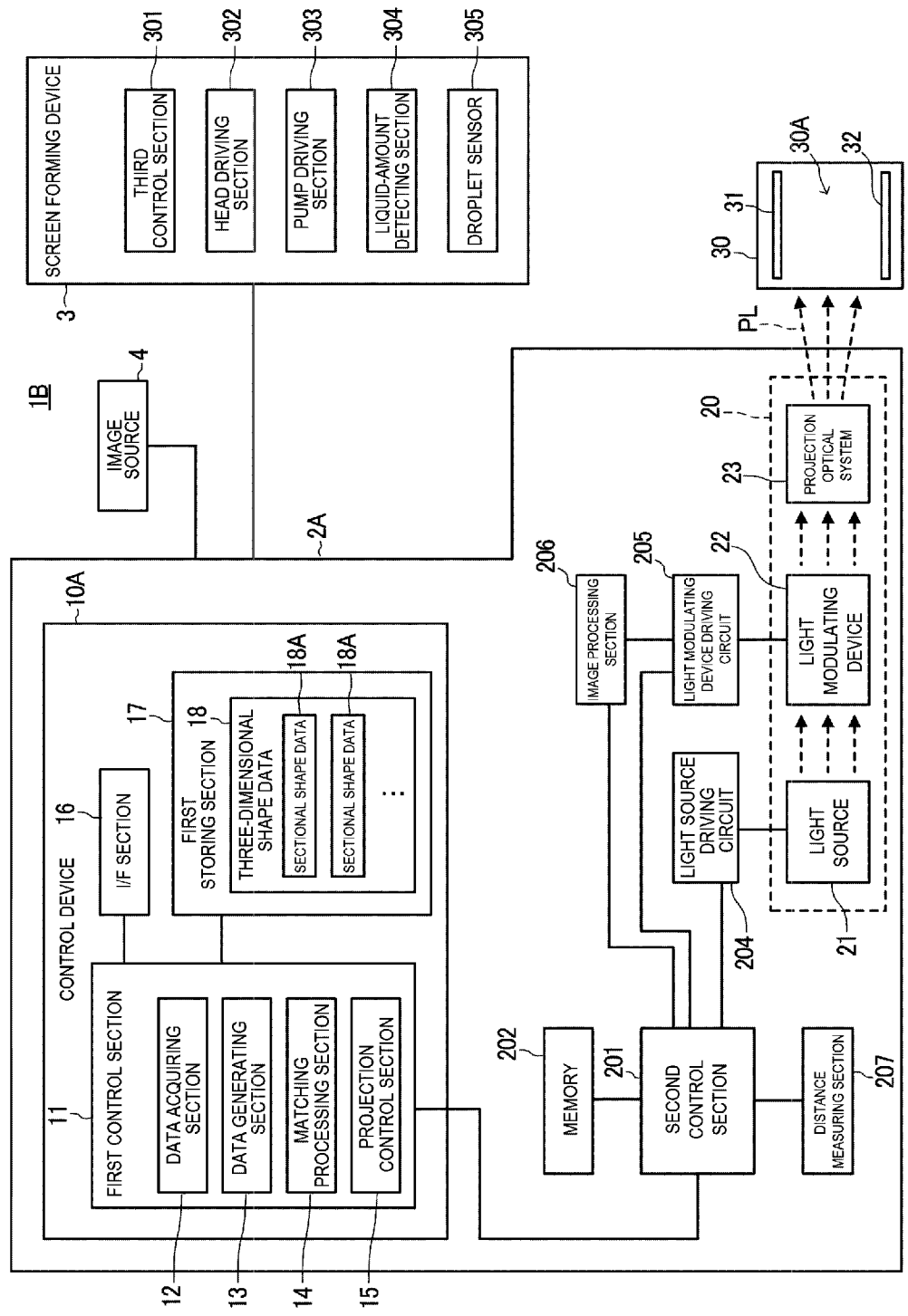
FIG. 31 is a block diagram of a projection system in a twelfth embodiment.

FIG. 31 is a block diagram of a projection system 1B in a twelfth embodiment.

In a configuration shown in FIG. 31, components common to the projection system 1 are denoted by the same reference numerals and signs and explanation of the components is omitted.

The projection system 1B includes a configuration in which the control device 10 included in the projection system 1 is integrally incorporated in a projector 2A. The projector 2A includes a control device 10A in addition to the components of the projector 2.

The control device 10A has the function of the control device 10 explained above. The first control section 11 is coupled to the second control section 201. The control device 10A executes the function of the control device 10 in the embodiments explained above. The projector 2A functions in the same manner as the projector 2.

With the projection system 1B, since the projector 2 functions as the control device 10 as well, it is possible to reduce a space required to set the projection system 1B.

13. Other Embodiments

The embodiments explained above indicate specific examples applied with the present disclosure. The present disclosure is not limited to the embodiments.

For example, in the embodiments, an example is explained in which the droplets DP are ejected downward from the ejection head 31 and a screen is formed by the falling droplets DP. The present disclosure is not limited to this. For example, the ejection head 31 may be set in a lower part of the screen forming device 3 and the droplets DP may be ejected upward to form a screen. The same applies to the configurations in which the ejection heads 51 and 54 are used.

In the embodiments explained above, a configuration is explained in which the ejection head 31 ejects the droplets DP one by one. However, the ejection head 31 may continuously eject the liquid to draw a line. That is, the ejection head 31 may form a screen with the liquid on a line extending in the Z-axis direction. The same applies in the configurations in which the ejection heads 51 and 54 are used.

In the embodiments explained above, the image light PL projected by the projector 2 may be the image light PL of a color image including light components of R, and B. However, the image light PL may be light of a single color or may be light including specific color light.

In the embodiments explained above, the image light PL may include light outside a visible region such as ultraviolet light or infrared light. In this case, for example, the liquid ejected by the screen forming device 3 may be liquid including a component that emits fluorescent light or phosphorescent light in the visible region by being irradiated with the light outside the visible region included in the image light PL.

The functional sections shown in the block diagrams of the projection systems 1, 1A, and 1B indicate functional components and do not limit specific implementation forms. For example, hardware individually corresponding to the functional sections does not always need to be mounted. It is also naturally possible that one processor executes a program to realize functions of a plurality of functional sections. A part of the functions realized by software in the embodiments may be realized by hardware or a part of the functions realized by hardware may be realized by software. Besides, specific detailed configurations of the other sections of the projector 2 can be optionally changed without departing from the gist.

The processing units of the flowcharts showing the operations of the projection systems 1, 1A, and 1B are divided according to the main processing contents in order to make it easy to understand the invention. The present disclosure is not limited by a method of division and names of the processing units shown in the flowcharts. The processing of the projection systems 1, 1A, and 1B can also be divided into a larger number of processing units according to the processing contents or can be divided such that one processing unit includes a larger number of kinds of processing. The processing order of the flowcharts is not limited to the illustrated examples.

What is claimed is:

1. A projection system that projects image light onto a screen, the projection system comprising:
   a screen forming device including a plurality of nozzles and configured to form the screen by ejecting liquid onto an optical path of the image light from the nozzles;
   a projection device including a light source and a light modulating device configured to modulate light emitted by the light source to form the image light, the projection device projecting the image light onto the screen; and
   a control device including a data generating section configured to divide three-dimensional shape data to generate a plurality of sectional shape data, the control device controlling the projection device and the screen forming device based on the sectional shape data, wherein
   the nozzles of the screen forming device are disposed side by side on an X-Y surface extending along a direction of an X axis, which is a direction along the optical path of the image light, and a direction of a Y axis crossing the X axis,
   the light modulating device included in the projection device has a configuration for forming an image using a plurality of pixels and modulating, with the pixels, the light emitted by the light source,
   the control device includes a matching processing section configured to correlate coordinates of the sectional shape data, coordinates in the pixels of the projection device, the nozzles of the screen forming device, and heights of an ejection space from the nozzles in a Z-axis direction orthogonal to the X-Y surface, and
   the plurality of sectional shape data represents a two-dimensional figure in a Y-Z surface extending along the Y axis and along the Z axis.

2. The projection system according to claim 1, wherein the data generating section generates the sectional shape data of a cross section orthogonal to the X axis by dividing the three-dimensional shape data in the X-axis direction.

3. The projection system according to claim 1, wherein the screen forming device drives the nozzles in a unit of a nozzle row including a plurality of the nozzles lined in the X-axis direction or the Y-axis direction and, after forming a screen in the nozzle row equivalent to a singularity of the sectional shape data, forms another screen in the nozzle row equivalent to another singularity of the sectional shape data.

4. The projection system according to claim 3, wherein the screen forming device forms the screen by ejecting the liquid from the nozzles associated with coordinates forming an image of the sectional shape data among the nozzles included in the nozzle row.

5. The projection system according to claim 3, wherein, after the screen forming device forms the screen equivalent to the sectional shape data, the projection device projects a sectional image based on the sectional shape data.

6. The projection system according to claim 3, wherein the screen forming device forms the screen by ejecting the liquid from a plurality of the nozzles including the nozzles not associated with coordinates forming an image of the sectional shape data among the nozzles included in the nozzle row equivalent to the sectional shape data.

7. The projection system according to claim 3, wherein the projection device projects a sectional image based on the sectional shape data according to timing when the screen forming device ejects the liquid from the nozzle row equivalent to the sectional shape data.

8. The projection system according to claim 1, wherein
the data generating section of the control device generates line segment shape data by dividing the sectional shape data in the Z-axis direction, and
the matching processing section correlates coordinates of the line segment shape data, the coordinates in the pixels of the projection device, the nozzles of the screen forming device, and the heights of the ejection space from the nozzles in the Z-axis direction.

9. The projection system according to claim 8, wherein the screen forming device drives the nozzles in a unit of a nozzle row including a plurality of the nozzles lined in the X-axis direction or the Y-axis direction, forms a singularity of the screen with the liquid ejected from a singularity of the nozzle row, and starts formation of another screen before the formation of the one screen by ejecting the liquid with a time difference from a plurality of the nozzle rows equivalent to a plurality of the sectional shape data.

10. The projection system according to claim 9, wherein the screen forming device forms the screen linear in shape having a unit height in the Z-axis direction with the liquid ejected from the nozzle row.

11. The projection system according to claim 10, wherein the projection device projects a linear image according to height in the Z-axis direction of the liner screen.

12. The projection system according to claim 11, wherein the projection device projects, according to a first height position in the Z-axis direction of the screen, the image smaller than a size in the Y-axis direction of the screen in the first height position.

13. The projection system according to claim 1, wherein
the control device extracts a contour of an image based on the sectional shape data from the coordinates of the sectional shape data, and
the screen forming device forms the screen with droplets by ejecting the liquid in a drop shape from the nozzles and differentiates a size of the droplets ejected from the nozzles corresponding to the contour of the image of the sectional shape data from a size of the droplets ejected from the other nozzles.

14. A projection system that projects image light onto a screen, the projection system comprising:
a screen forming device including a plurality of nozzles and configured to form the screen by ejecting liquid onto an optical path of the image light from the nozzles; and
a projection device configured to draw an image using a plurality of pixels and project image light modulated by the pixels onto the screen, wherein
when a direction along the image light is represented as an X axis, an axis orthogonal to the X axis is represented as a Y axis, and an axis orthogonal to the X axis and the Y axis is represented as a Z axis, the screen forming device includes the nozzles disposed side by side in the X-axis direction and the Y-axis direction,
the projection device includes a storing section configured to store three-dimensional display formation data obtained by executing matching processing for correlating coordinates of a plurality of sectional shape data obtained by dividing three-dimensional shape data in the X-axis direction with the pixels and heights of an ejection space in the Z-axis direction from the nozzles,
the projection system drives the pixels and the nozzles of the screen forming device based on the three-dimensional display formation data stored in the storing section of the projection device, and
the plurality of sectional shape data represents a two-dimensional figure in a Y-Z surface extending along the Y axis and along the Z axis.

15. A projection system comprising:
a projection device including a light source and a light modulating device configured to modulate light emitted by the light source to form image light, the projection device projecting the image light;
a screen forming device including a plurality of nozzles disposed side by side in a first direction along an optical path of the image light and a second direction crossing the first direction, the screen forming device forming a screen by ejecting liquid onto an optical path of the image light from the nozzles; and
a control device configured to control the projection device and the screen forming device based on a plurality of sectional shape data, formed by a three-dimensional coordinate system having an X axis, a Y axis, and a Z axis orthogonal to one another, obtained by dividing three-dimensional shape data, wherein
the control device causes the projection device to project the image light of an image based on the sectional shape data, controls, based on the sectional shape data, timing for ejecting the liquid from a plurality of the nozzles lined in the second direction, and performs control for matching timing for ejecting the liquid from a plurality of the nozzles lined in the first direction with timing when the projection device switches the sectional shape data, and
the plurality of sectional shape data represents a two-dimensional figure in a Y-Z surface extending along the Y axis and along the Z axis.

16. A control device used in combination with a projection device that projects image light and a screen forming device that forms a screen by ejecting liquid onto an optical path of the image light from a plurality of nozzles, the control device comprising:
a data generating section configured to acquire a plurality of three-dimensional shape data formed by a three-dimensional coordinate system having an X axis, a Y axis, and a Z axis orthogonal to one another and divide the three-dimensional shape data to generate sectional shape data; and
a matching processing section configured to correlate coordinates of the sectional shape data, pixels with which the projection device draws an image, the nozzles of the screen forming device, and heights in an ejection space of the liquid ejected from the nozzles, wherein the plurality of sectional shape data represents a two-dimensional figure in a Y-Z surface extending along the Y axis and along the Z axis.

17. An image projection method for projecting an image using a screen forming device that forms a screen by ejecting liquid from a plurality of nozzles and a projection device that draws an image using a plurality of pixels and projects image light modulated by the pixels onto the screen, the image projection method comprising:

acquiring a plurality of three-dimensional shape data formed by a three-dimensional coordinate system having an X axis, a Y axis, and a Z axis orthogonal to one another;

dividing the three-dimensional shape data in the X-axis direction to generate sectional shape data;

acquiring coordinates of the sectional shape data;

executing matching processing for correlating coordinates of the sectional shape data, pixels with which the projection device draws an image, the nozzles of the screen forming device, and heights in an ejection space of the liquid ejected from the nozzles; and driving the pixels and the nozzles of the screen forming device based on the sectional shape data and according to the correlation by the matching processing and projecting an image onto the screen, wherein the plurality of sectional shape data represents a two-dimensional figure in a Y-Z surface extending along the Y axis and along the Z axis.

* * * * *